US012614863B2

(12) United States Patent
Kim et al.

(10) Patent No.: US 12,614,863 B2
(45) Date of Patent: Apr. 28, 2026

(54) DISPLAY PANEL AND A DISPLAY DEVICE INCLUDING THE SAME

(71) Applicants: SAMSUNG DISPLAY CO., LTD., Yongin-si (KR); Seoul National University R&DB Foundation, Seoul (KR)

(72) Inventors: Ki Seo Kim, Yongin-si (KR); Jung Suek Oh, Seoul (KR); Byeong Jin Kim, Seoul (KR); Jin Woo Kim, Yongin-si (KR); Jeong Taek Oh, Seoul (KR); Jae Uk Choi, Yongin-si (KR)

(73) Assignees: SAMSUNG DISPLAY CO., LTD., Yongin-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 249 days.

(21) Appl. No.: 18/382,098

(22) Filed: Oct. 20, 2023

(65) Prior Publication Data

US 2024/0291168 A1 Aug. 29, 2024

(30) Foreign Application Priority Data

Feb. 23, 2023 (KR) ........................ 10-2023-0024426

(51) Int. Cl.
*H01Q 21/24* (2006.01)
*H01Q 1/38* (2006.01)
*H01Q 21/00* (2006.01)

(52) U.S. Cl.
CPC ............. *H01Q 21/245* (2013.01); *H01Q 1/38* (2013.01); *H01Q 21/0025* (2013.01); *H01Q 21/0087* (2013.01)

(58) Field of Classification Search
CPC H01Q 1/243; H01Q 1/38; H01Q 1/48; H01Q 1/12; H01Q 1/36; H01Q 9/0407;
(Continued)

(56) References Cited

U.S. PATENT DOCUMENTS

| | | | | |
|---|---|---|---|---|
| 11,296,401 | B2 * | 4/2022 | Kim | H01Q 9/0407 |
| 2020/0259245 | A1 * | 8/2020 | Kim | H01Q 1/243 |

(Continued)

FOREIGN PATENT DOCUMENTS

| | | | |
|---|---|---|---|
| DE | 19729664 | A1 | 2/1999 |
| KR | 10-2019-0019802 | | 2/2019 |

(Continued)

OTHER PUBLICATIONS

Extended European Search Report issued in corresponding application No. EP 24158163.6 on Aug. 8, 2024.

*Primary Examiner* — Wei (Victor) Y Chan
(74) *Attorney, Agent, or Firm* — F. CHAU & ASSOCIATES, LLC

(57) ABSTRACT

A display device includes: a display panel including a display area for displaying an image, a non-display area disposed at an edge of the display area, and an antenna area protruding from a part of the non-display area in a first direction; an antenna module disposed on a boundary between the antenna area and a dead space area of the non-display area, wherein the dead space area is adjacent to the antenna area, and wherein the antenna module includes a first antenna and a second antenna; and an antenna driving circuit electrically connected to the antenna module through an antenna pad disposed on the antenna area, wherein the first antenna is configured to generate an X-axis polarization parallel to the first direction, and the second antenna is configured to generate a Y-axis polarization in a second direction perpendicular to the first direction.

20 Claims, 31 Drawing Sheets

(58) Field of Classification Search
CPC .... H01Q 1/241; H01Q 21/0025; H01Q 21/28; H01Q 1/1207; H01Q 1/1221; H01Q 21/0006
See application file for complete search history.

(56) References Cited

U.S. PATENT DOCUMENTS

| | | | | |
|---|---|---|---|---|
| 2022/0131279 | A1* | 4/2022 | Kim | H01Q 21/24 |
| 2023/0223708 | A1 | 7/2023 | Lee et al. | |

FOREIGN PATENT DOCUMENTS

| | | | |
|---|---|---|---|
| KR | 10-2020-0039311 | | 4/2020 |
| KR | 10-2021-0079684 | | 6/2021 |
| KR | 10-2022-0063129 | | 5/2022 |
| KR | 10-2022-0069557 | | 5/2022 |
| KR | 10-2023-0101675 | A | 7/2023 |
| WO | WO2022055205 | A1 | 3/2022 |

* cited by examiner

DISL: SUB, TFTL, EML, ENC, SENL

DISPLAY PANEL AND A DISPLAY DEVICE INCLUDING THE SAME

CROSS-REFERENCE TO RELATED APPLICATION

This application claims priority under 35 U.S.C. 119 to Korean Patent Application No. 10-2023-0024426 filed on Feb. 23, 2023 in the Korean Intellectual Property Office, the disclosure of which is incorporated by reference herein in its entirety.

1. TECHNICAL FIELD

The present disclosure relates to a display panel and a display device including the same.

2. DESCRIPTION OF THE RELATED ART

As we progress to an information-oriented society, the demand for display devices continues to grow. For example, display devices are now integral components in numerous electronic devices such as smartphones, digital cameras, laptop computers, navigation devices, and smart televisions.

The display device may include an antenna to facilitate wireless communication via electromagnetic waves. For example, the display device may include an antenna suited for both fourth generation (4G) mobile communication such as long term evolution (LTE) and fifth generation (5G) mobile communication. The frequency band of these electromagnetic waves changes based on the communication technology in use, and the shape or the length of the antenna may vary according to the frequency band of the electromagnetic wave.

SUMMARY

Embodiments of the present disclosure provide a display panel that facilitates wireless communication by incorporating an antenna electrode in a non-display area, and a display device including the same.

Embodiments of the present disclosure also provide a display panel that increases the efficiency of wireless communication transmission and reception by forming an antenna electrode having a dual polarization structure in the non-display area, and a display device including the same.

According to an embodiment of the present disclosure, a display device including: a display panel including a display area for displaying an image, a non-display area disposed at an edge of the display area, and an antenna area protruding from a part of the non-display area in a first direction; an antenna module disposed on a boundary between the antenna area and a dead space area of the non-display area, wherein the dead space area is adjacent to the antenna area, and wherein the antenna module comprises a first antenna and a second antenna; and an antenna driving circuit electrically connected to the antenna module through an antenna pad disposed on the antenna area, wherein the first antenna is configured to generate an X-axis polarization parallel to the first direction, and the second antenna is configured to generate a Y-axis polarization in a second direction perpendicular to the first direction.

The first antenna includes: a first antenna electrode connected to a first feed line; a second antenna electrode comprising a first slot branched in one direction from a first end of the first antenna electrode, wherein the second antenna electrode is connected to a first ground line, and has a length extending in the first direction; and a third antenna electrode comprising a second slot branched from the first end of the first antenna electrode in another direction opposite to the one direction, wherein the third antenna is connected to a second ground line, and has a length extending in the first direction, wherein the first slot and the second slot are symmetrical with respect to the first antenna electrode.

The second antenna electrode of the first antenna includes another first slot, and a connection slot extending in the second direction to connect the first slots to each other, and the third antenna electrode of the first antenna comprises another second slot, and a connection slot extending in the second direction to connect the second slots to each other.

The first antenna electrode is spaced apart from the first feed line.

The first antenna electrode has a tapered shape such that is has a first width in a region closest to the first feed line and a second width greater than the first width in a region farthest from the first feed line.

The first antenna further includes at least one slit disposed in parallel with the first slot and extending in the first direction.

The first feed line, the first ground line, and the second ground line are disposed on one surface of the antenna area, and the first feed line is disposed between the first ground line and the second ground line.

The second antenna includes: a fourth antenna electrode connected to a second feed line; a fifth antenna electrode including a third slot branched in one direction from a first end of the fourth antenna electrode, wherein the fifth antenna electrode is connected to a third ground line, and has a length extending in the second direction; and a sixth antenna electrode comprising a fourth slot branched from the first end of the fourth antenna electrode in another direction opposite to the one direction, wherein the sixth antenna electrode is connected to a fourth ground line, and has a length extending in the second direction, wherein a length of the fifth antenna electrode in the second direction is longer than a length of the sixth antenna electrode in the second direction; a length of the third slot in the second direction is longer than a length of the fourth slot in the second direction.

The second feed line, the third ground line, and the fourth ground line are disposed on one surface of the antenna area, and the second feed line is disposed between the third ground line and the fourth ground line.

The first antenna and the second antenna are spaced apart from each other in the second direction.

The antenna module includes a pair of second antennas and a single first antenna, and the first antenna is disposed between the pair of second antennas.

The antenna module includes a pair of first antennas and a single second antenna, and the second antenna is disposed between the pair of first antennas.

The antenna module includes a first antenna group including a plurality of first antennas and a second antenna group including a plurality of second antennas, and the first antenna group and the second antenna group are spaced apart from each other.

The first antenna is disposed in a part of the dead space area and a part of the antenna area, and the second antenna is disposed parallel to the first antenna in the dead space area.

The first antenna is disposed in a part of the dead space area, and the second antenna is disposed parallel to the first antenna in the dead space area.

At least a part of the antenna area is bent and disposed under the display panel.

The first antenna and the second antenna are formed by the same process as at least some metals contained in a thin film transistor layer of the display panel.

The first antenna and the second antenna are formed by the same process as at least some metals contained in a sensor electrode layer of the display panel.

The antenna module includes a stacked structure formed by a flexible printed circuit board (FPCB) manufacturing process, the stacked structure of the antenna module includes: a transparent dielectric layer attached to the display panel; an antenna layer disposed on a top surface of the transparent dielectric layer; and a ground layer disposed on a bottom surface of the transparent dielectric layer, wherein the antenna layer includes an antenna electrode of each of the first antenna and the second antenna, and the ground layer includes a ground line.

According to an embodiment of the present disclosure, a display panel includes: a display area for displaying an image; a non-display area disposed at an edge of the display area, and an antenna area protruding from the non-display area in a first direction, the display panel further including: an antenna module disposed on a boundary between the antenna area and a dead space area of the non-display area, wherein the dead space area is adjacent to the antenna area, and wherein the antenna module includes a first antenna and a second antenna; and an antenna driving circuit electrically connected to the antenna module through an antenna pad disposed on the antenna area, wherein the first antenna is configured to generate an X-axis polarization parallel to the first direction, and the second antenna is configured to generate a Y-axis polarization in a second direction perpendicular to the first direction.

In the display panel and the display device including the display panel according to embodiments of the present disclosure, wireless communication is supported by forming the antenna electrode in the non-display area.

In addition, in the display panel and the display device including the display panel according to the embodiments, wireless communication transmission and reception efficiency is increased by forming the antenna electrodes having a dual polarization structure in the non-display area.

BRIEF DESCRIPTION OF THE DRAWINGS

The above and other features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings. This disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers may indicate the same components throughout the specification.

It will be understood that, although the terms "first," "second," etc. may be used herein to describe various elements, these elements should not be limited by these terms. These terms are merely used to distinguish one element from another element. For instance, a first element discussed below could be termed a second element. Similarly, the second element could also be termed the first element.

The features of various embodiments of the present disclosure may be combined, either partially or entirely, and can technically interact with each other in different ways. Additionally, these embodiments may be implemented independently or in association with each other.

Figure 1:
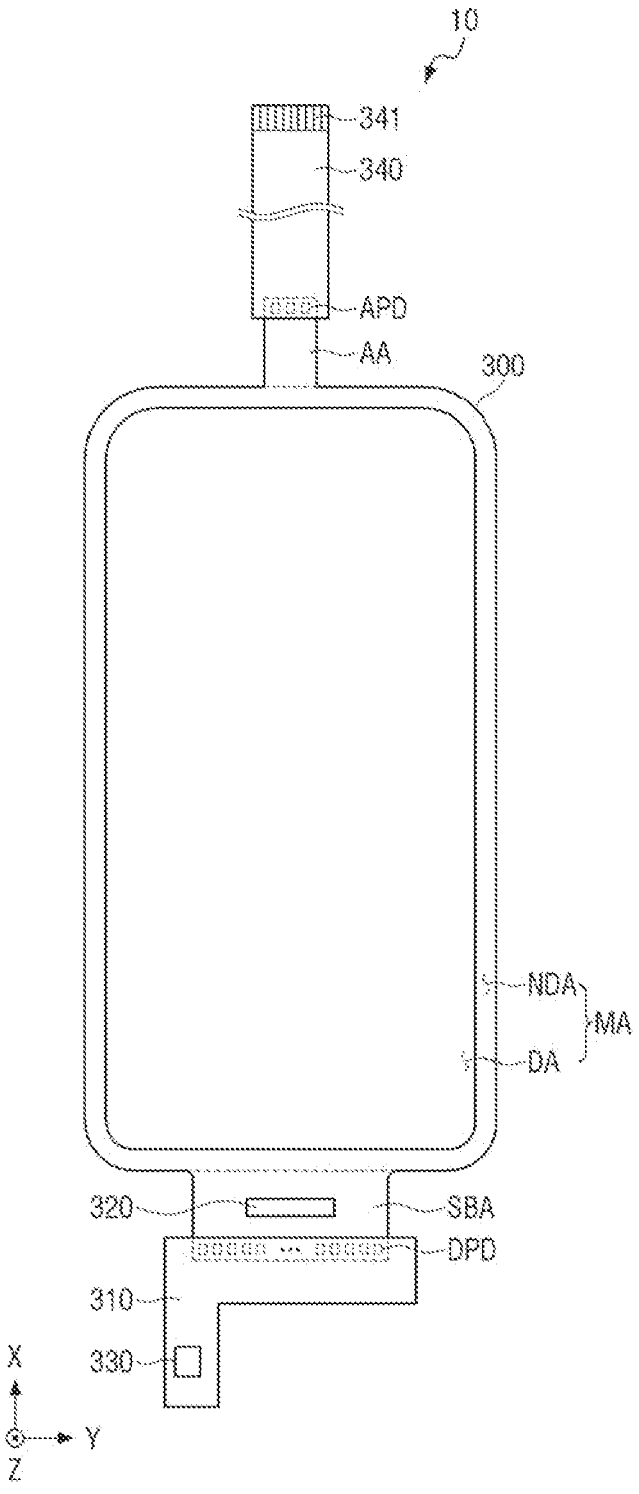
FIGS. 1 and 2 are plan views illustrating a display device according to one embodiment.
Figure 2:
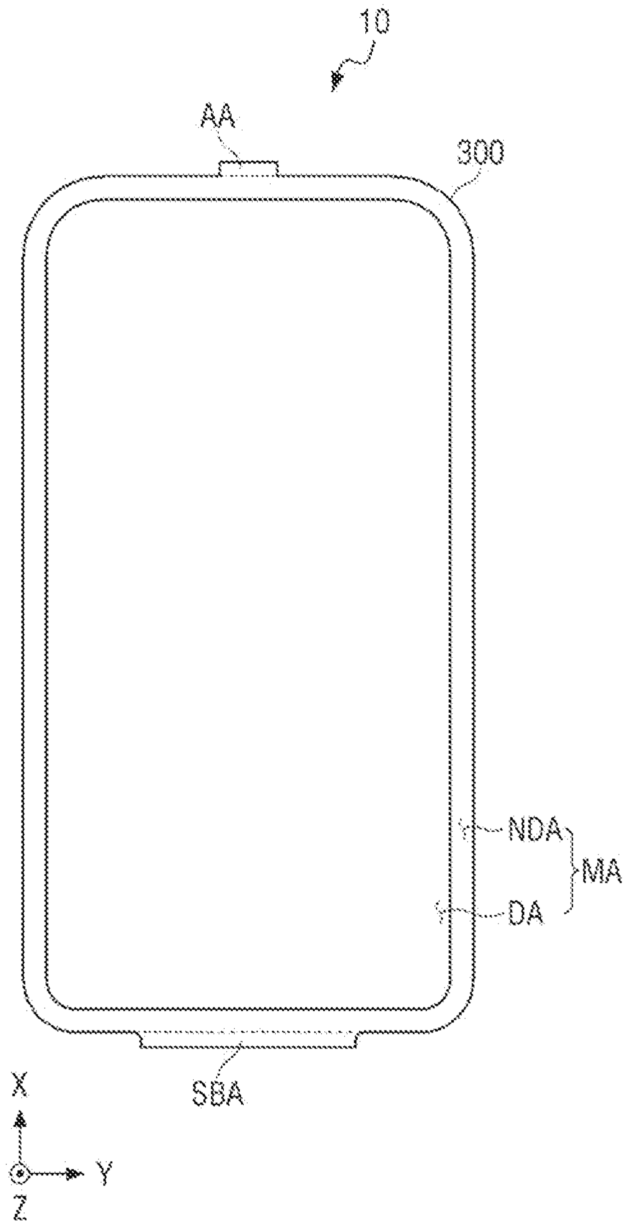

FIGS. 1 and 2 are plan views illustrating a display device according to one embodiment.

Referring to FIGS. 1 and 2, a display device 10 according to one embodiment may be applied to portable electronic devices such as a mobile phone, a smartphone, a tablet personal computer, a mobile communication terminal, an electronic organizer, an electronic book, a portable multimedia player (PMP), a navigation system, an ultra mobile personal computer (UMPC) or the like. Alternatively, the display device 10 according to one embodiment may be applied as a display unit of a television, a laptop, a monitor, a billboard, or an Internet-of-Things (IoT) terminal. Alternatively, the display device 10 according to one embodiment may be applied to wearable devices such as a smart watch, a watch phone, a glasses type display, or a head mounted display (HMD). Alternatively, the display device 10 according to one embodiment may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

In the present disclosure, a first direction (X-axis direction) may be a long side direction of the display device 10, for example, a vertical direction of the display device 10. A second direction (Y-axis direction) may be a short side direction of the display device 10, for example, a horizontal direction of the display device 10. A third direction (Z-axis direction) may be a thickness direction of the display device 10. The corner where the long side in the first direction (X-axis direction) and the short side in the second direction (Y-axis direction) meet may be rounded to have a predetermined curvature or may be right-angled.

The display device 10 according to one embodiment includes a display panel 300, a display circuit board 310, a display driving circuit 320, a touch driving circuit 330, and an antenna circuit board 340. A connector 341 may be formed on one side of the antenna circuit board 340. For example, the connector 341 may be located on a second side of the antenna circuit board 340 which is opposite a first side of the antenna circuit board 340, the first side being adjacent to the display panel 300.

The display panel 300 may be a light emitting display panel including a light emitting element. For example, the display panel 300 may be an organic light emitting display panel using an organic light emitting diode including an organic light emitting layer, a micro light emitting diode display panel using a micro light emitting diode, a quantum dot light emitting display panel using a quantum dot light emitting diode including a quantum dot light emitting layer, or an inorganic light emitting display panel using an inorganic light emitting element including an inorganic semiconductor.

The display panel 300 may be a flexible display panel that is flexible and may be easily bent, folded, or rolled. For example, the display panel 300 may be a foldable display panel which can be folded and unfolded, a curved display panel having a curved display surface, a bendable display panel having a bent area other than the display surface, a rollable display panel which can be rolled up and rolled out, or a stretchable display panel which can be stretched. The display panel 300 may include a main area MA, a sub-area SBA protruding from one side of the main area MA, and an antenna area AA protruding from the other side of the main area MA. For example, the sub-area SBA may protrude from a first side of the main area MA and the antenna area AA may protrude from a second side of the main area MA.

The main area MA may include a display area DA for displaying an image and a non-display area NDA that is a peripheral area of the display area DA. The display area DA may occupy most of the main area MA. The display area DA may be disposed at the center of the main area MA. The non-display area NDA may be an area outside the display area DA. The non-display area NDA may be an edge area of the display panel 300. The non-display area NDA may be referred to as a dead space area DS.

The sub-area SBA may protrude in the first direction (X-axis direction) from one side of the main area MA. For example, one side of the main area MA may be a lower side of the main area MA. As illustrated in FIG. 1, the length of the sub-area SBA in the first direction (X-axis direction) may be smaller than the length of the main area MA in the first direction (X-axis direction), and the length of the sub-area SBA in the second direction (Y-axis direction) may be smaller than the length of the main area MA in the second direction (Y-axis direction), but the embodiment of the present disclosure is not limited thereto.

Referring to FIG. 2, the sub-area SBA may be bent, and at least a part of the bent sub-area SBA may be disposed under the display panel 300. In this case, at least a part of the sub-area SBA may overlap the main area MA of the display panel 300 in the third direction (Z-axis direction).

Display pads DPD may be disposed at one side edge of the sub-area SBA. One side edge of the sub-area SBA may be a lower side edge of the sub-area SBA. The display circuit board 310 may be attached to the display pads DPD of the sub-area SBA. The display circuit board 310 may be attached to the display pads DPD of the sub-area SBA by using a conductive adhesive member such as an anisotropic conductive film or an anisotropic conductive paste. The display circuit board 310 may be a flexible printed circuit board (FPCB) which is bendable, a rigid printed circuit board (PCB) which is solid and can be hardly bent, or a composite printed circuit board having both of the rigid printed circuit board and the flexible printed circuit board.

The display driving circuit 320 may be disposed on the sub-area SBA of the display panel 300. The display driving circuit 320 may receive control signals and power voltages, and generate and output signals and voltages for driving the display panel 300. The display driving circuit 320 may be formed as an integrated circuit (IC).

The touch driving circuit 330 may be disposed on the display circuit board 310. The touch driving circuit 330 may be formed as an integrated circuit. The touch driving circuit 330 may be attached to the display circuit board 310.

The touch driving circuit 330 may be electrically connected to sensor electrodes of a sensor electrode layer of the display panel 300 through the display circuit board 310. The touch driving circuit 330 may output a touch driving signal to each of the sensor electrodes, and may sense a voltage change according to mutual capacitance of the sensor electrodes.

The sensor electrode layer of the display panel 300 may sense a proximity touch and/or a contact touch. The contact touch refers to the case where the object such as the human finger or pen makes a direct contact with the cover window disposed above the sensor electrode layer. The proximity touch refers to the case where the object such as the human finger or pen is positioned above the cover window to be proximately apart therefrom, such as hovering.

A power supply unit for supplying driving voltages for driving the display pixels of the display panel 300 and the display driving circuit 320 may be additionally disposed on the display circuit board 310. Alternatively, the power supply unit may be integrated with the display driving circuit 320, and in this case, the display driving circuit 320 and the power supply unit may be formed as a single integrated circuit.

The antenna area AA may be an area including at least one component among an antenna electrode, a feed line, and a ground line of an antenna module for wireless communication. The antenna area AA may protrude from the other side of the main area MA in the first direction (X-axis direction). For example, the other side of the main area MA may be an upper side of the main area MA. As illustrated in FIG. 1, the length of the antenna area AA in the first direction (X-axis direction) may be smaller than the length of the main area MA in the first direction (X-axis direction), and the length of the antenna area AA in the second direction (Y-axis direction) may be smaller than the length of the main area MA in the second direction (Y-axis direction), but the embodiment of the present disclosure is not limited thereto.

As illustrated in FIG. 2, at least a part of the antenna area AA may be bent, and at least a part of the bent antenna area AA may be disposed below the display panel 300. In this case, at least a part of the antenna area AA may overlap the main area MA of the display panel 300 in the third direction (Z-axis direction).

Antenna pads APD may be disposed at one side edge of the antenna area AA. The antenna circuit board 340 may be attached to the antenna pads APD of the antenna area AA. For example, the antenna pads APD may be overlapped by the first side of the antenna circuit board 340. The antenna circuit board 340 may be attached to the antenna pads APD of the antenna area AA by using a conductive adhesive member such as an anisotropic conductive film and an anisotropic conductive adhesive. One side of the antenna circuit board 340 may include the connector 341 that is connected to a main circuit board 400 on which an antenna driving circuit 350 (see FIG. 4) is mounted. The antenna circuit board 340 may be a flexible printed circuit board (FPCB) that may be bent.

Figure 3:
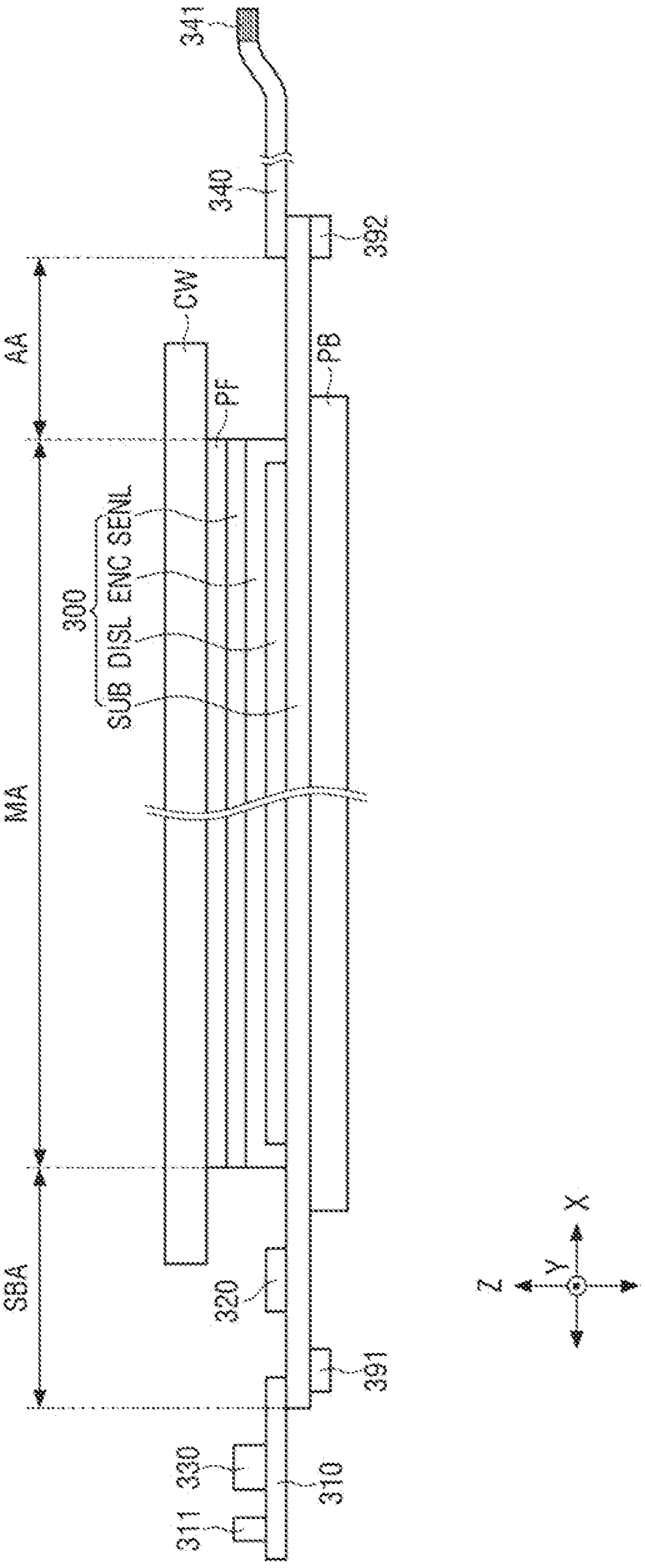
FIGS. 3 and 4 are side views illustrating a display device according to one embodiment.
Figure 4:
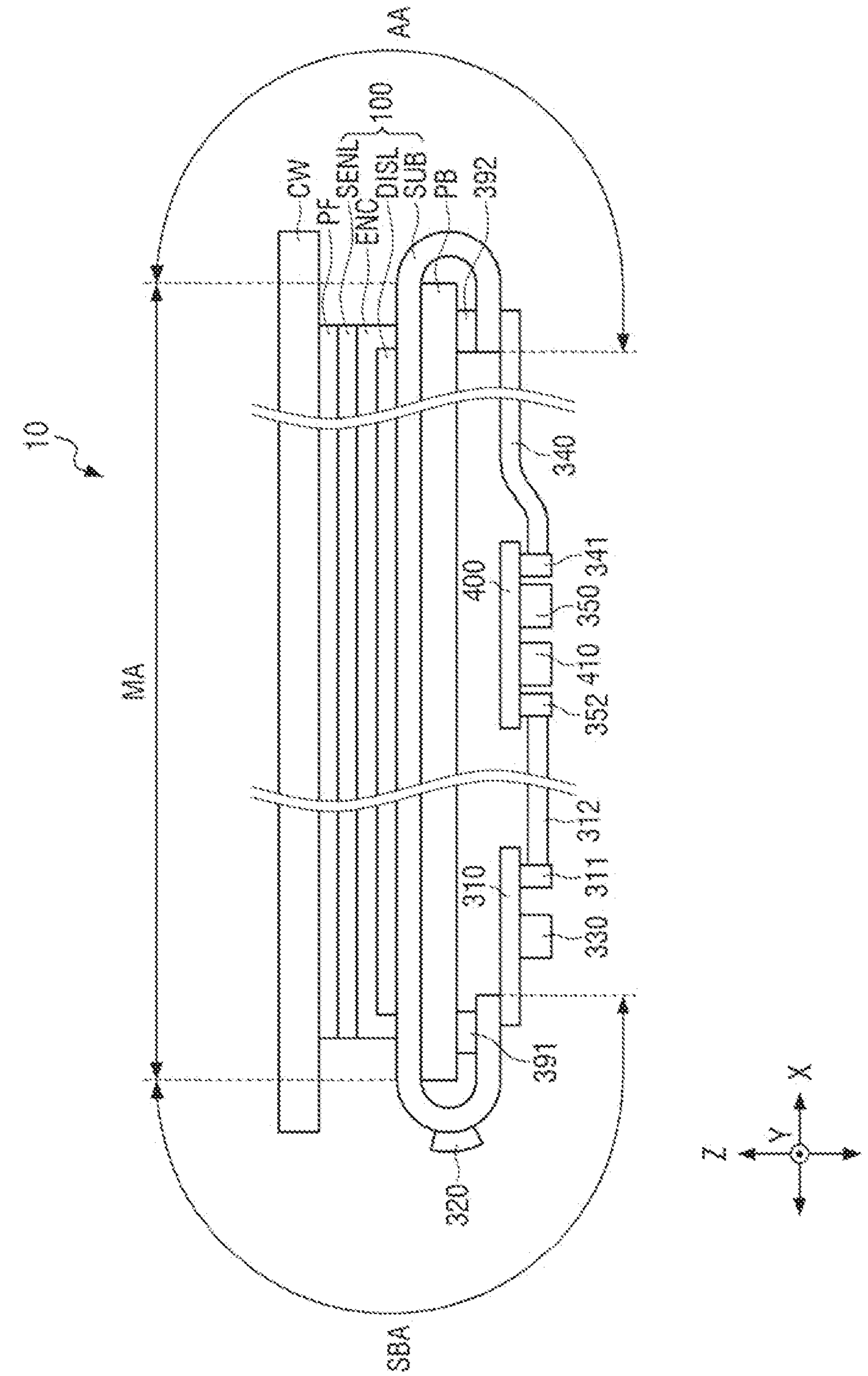

FIGS. 3 and 4 are side views illustrating a display device according to one embodiment.

Referring to FIGS. 3 and 4, the display device 10 according to one embodiment may include the display panel 300, a polarizing film PF, a cover window CW, and a panel lower cover PB. The display panel 300 may include a substrate SUB, a display layer DISL, an encapsulation layer ENC, and a sensor electrode layer SENL.

The substrate SUB may be formed of an insulating material such as polymer resin. The substrate SUB may be a flexible substrate which can be bent, folded or rolled.

The display layer DISL may be disposed on the main area MA of the substrate SUB.

The display layer DISL may be a layer that displays an image by including emission areas. The display layer DISL may include a thin film transistor layer in which thin film transistors are formed, and a light emitting element layer in which light emitting elements for emitting light are disposed in emission areas.

In the display area DA of the display layer DISL, not only emission areas but also scan lines, data lines, power lines, and the like for driving light emitting elements in the emission areas may be disposed. In the non-display area NDA of the display layer DISL, a scan driver for outputting scan signals to the scan lines, fan-out lines connecting the data lines and the display driving circuit 320, and the like may be disposed.

The encapsulation layer ENC may be disposed on the display layer DISL. The encapsulation layer ENC may be a layer for encapsulating the light emitting element layer of the display layer DISL to prevent permeation of oxygen or moisture into the light emitting element layer of the display layer DISL. The encapsulation layer ENC may be disposed on the top surfaces and the side surfaces of the display layer DISL.

The sensor electrode layer SENL may be disposed on the display layer DISL. The sensor electrode layer SENL may include sensor electrodes. The sensor electrode layer SENL may sense a touch using sensor electrodes.

The polarizing film PF may be disposed on the sensor electrode layer SENL. The polarizing film PF may include a first base member, a linear polarization plate, a phase retardation film such as a quarter-wave plate (λ/4 plate), and a second base member. The first base member, the phase retardation film, the linear polarization plate, and the second base member may be sequentially stacked on the sensor electrode layer SENL.

The cover window CW may be disposed on the polarizing film PF. The cover window CW may be attached on the polarizing film PF by a transparent adhesive member such as an optically clear adhesive (OCA) film. Edges of the cover window CW may extend beyond edges of the display panel 300.

The panel lower cover PB may be disposed under the display panel 300. The panel lower cover PB may be attached to the bottom surface of the display panel 300 through an adhesive member. The adhesive member may be a pressure sensitive adhesive (PSA). The panel lower cover PB may include at least one of a light blocking member for absorbing light incident from the outside, a buffer member for absorbing an impact from the outside, or a heat dissipation member for efficiently dissipating heat from the display panel 300.

The light blocking member may be disposed under the display panel 300. The light blocking member blocks light transmission, thereby preventing components (e.g., the display circuit board 310 and the like) disposed under the light blocking member from being viewed from the top of the display panel 300. The light blocking member may include a light absorbing material such as a black pigment, black dyes or the like.

The buffer member may be disposed under the light blocking member. The buffer member absorbs an external impact to prevent the display panel 300 from being damaged. The buffer member may be formed of a single layer or multiple layers. For example, the buffer member may be formed of a polymer resin such as polyurethane (PU), polycarbonate (PC), polypropylene (PP), or polyethylene (PE) or may include an elastic material such as a foamed sponge obtained from rubber, a urethane-based material, or an acrylic material.

The heat dissipation member may be disposed under the buffer member. The heat dissipation member may include a first heat dissipation layer containing graphite, carbon nanotubes or the like, and a second heat dissipation layer formed of a metal thin film containing, for example, copper, nickel, ferrite, or silver which can shield electromagnetic waves and has excellent thermal conductivity.

As illustrated in FIG. 4, the sub-area SBA of the substrate SUB may be bent and disposed below the display panel 300. The sub-area SBA of the substrate SUB may be attached to the bottom surface of the panel lower cover PB by a first adhesive member 391. The first adhesive member 391 may be a pressure sensitive adhesive.

As illustrated in FIG. 4, the antenna area AA of the substrate SUB may be bent and disposed below the display panel 300. The antenna area AA of the substrate SUB may be attached to the bottom surface of the panel lower cover PB by a second adhesive member 392. The second adhesive member 392 may be a pressure sensitive adhesive.

The display circuit board 310 may be attached to the display pads DPD of the sub-area SBA of the substrate SUB by using a conductive adhesive member such as an anisotropic conductive film or an anisotropic conductive adhesive. The display circuit board 310 may include a connector 311 connected to a flexible printed circuit board 312. The display circuit board 310 may be connected to a connector 352 of the main circuit board 400 through the flexible printed circuit board 312. For example, the flexible printed circuit board 312 may be disposed between the connectors 311 and 352.

The touch driving circuit 330 may be disposed on the display circuit board 310. The touch driving circuit 330 may generate touch data according to changes in electrical signals sensed by each of the sensor electrodes of the sensor electrode layer of the display panel 300 and transmit the touch data to a main processor 410 of the main circuit board 400, and the main processor 410 may calculate a touch coordinate in which a touch occurs by analyzing the touch data.

The antenna circuit board 340 may be attached to the antenna pads APD of the antenna area AA of the substrate SUB by using a conductive adhesive member such as an anisotropic conductive film or an anisotropic conductive adhesive. A connector 341 of the antenna circuit board 340 may be connected to the connector 352 of the main circuit board 400. The antenna area AA may be connected to the main circuit board 400 by the antenna circuit board 340.

The main circuit board 400 may be a rigid printed circuit board (PCB) that is hard and does not easily bend. The main processor 410 and the antenna driving circuit 350 may be disposed on the main circuit board 400.

The antenna driving circuit 350 may be electrically connected to antennas ANT1 and ANT2 (see FIG. 7) of the display panel 300 through the antenna circuit board 340. Accordingly, the antenna driving circuit 350 may receive electromagnetic wave signals through the antennas and output electromagnetic wave signals to be transmitted through the antenna. The antenna circuit board 340 may be formed of an integrated circuit (IC).

The antenna driving circuit 350 may process electromagnetic wave signals transmitted and received through antennas. For example, the antenna driving circuit 350 may change the amplitude of an electromagnetic wave signal received by antennas. Alternatively, the antenna driving circuit 350 may change the phase as well as the amplitude of the electromagnetic wave signal received by the antenna electrodes. The antenna driving circuit 350 may transmit the processed electromagnetic wave signal to a mobile communication module. The mobile communication module may be disposed on the main circuit board 400.

The antenna driving circuit 350 may change the amplitude of the electromagnetic wave signal transmitted from the mobile communication module. Alternatively, the antenna driving circuit 350 may change the phase as well as the amplitude of the electromagnetic wave signal transmitted from the mobile communication module. The antenna driving circuit 350 may transmit the processed electromagnetic wave signal to antennas.

Figure 5:
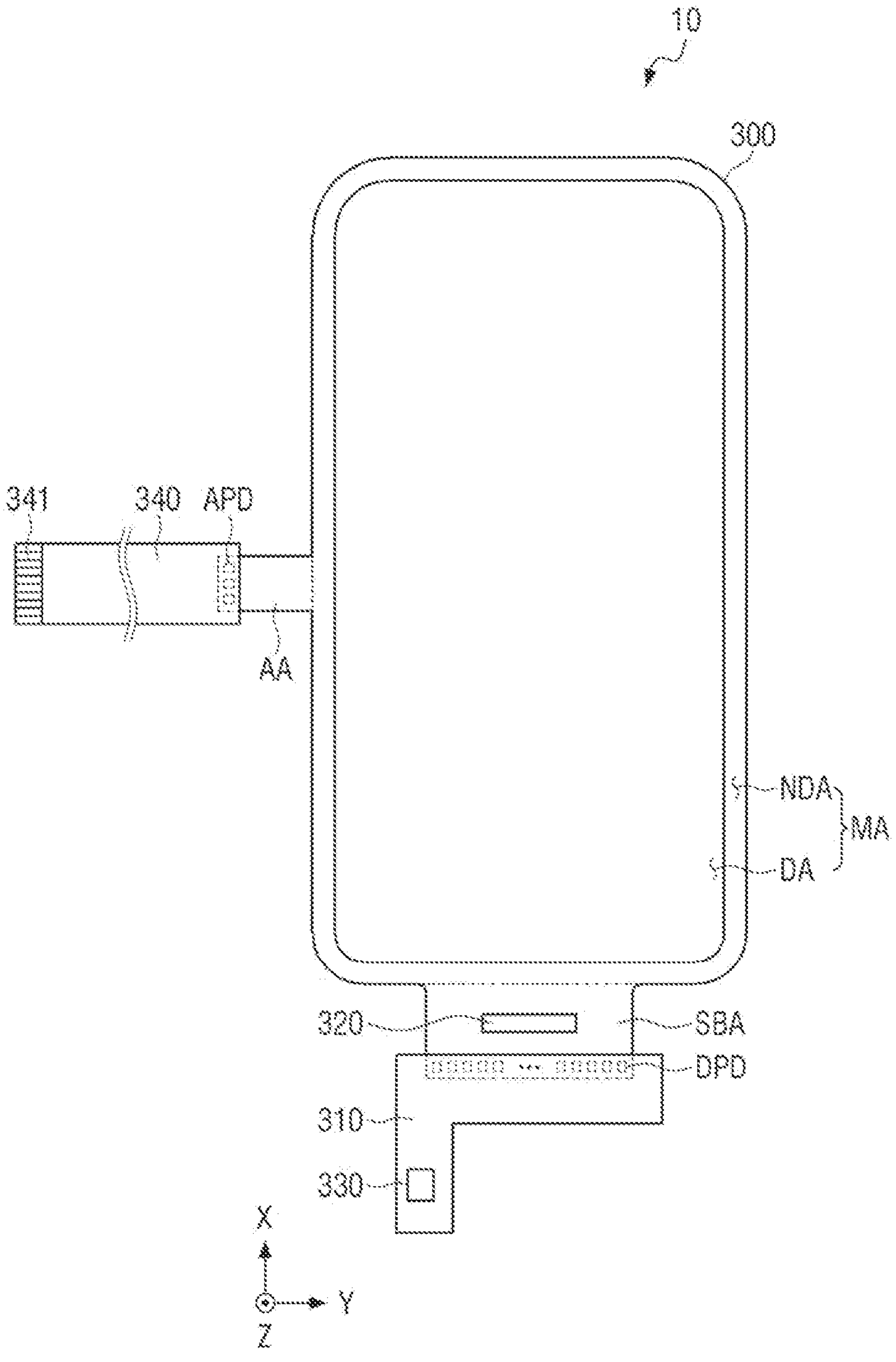
FIGS. 5 and 6 are plan views illustrating a display device according to another embodiment.
Figure 6:
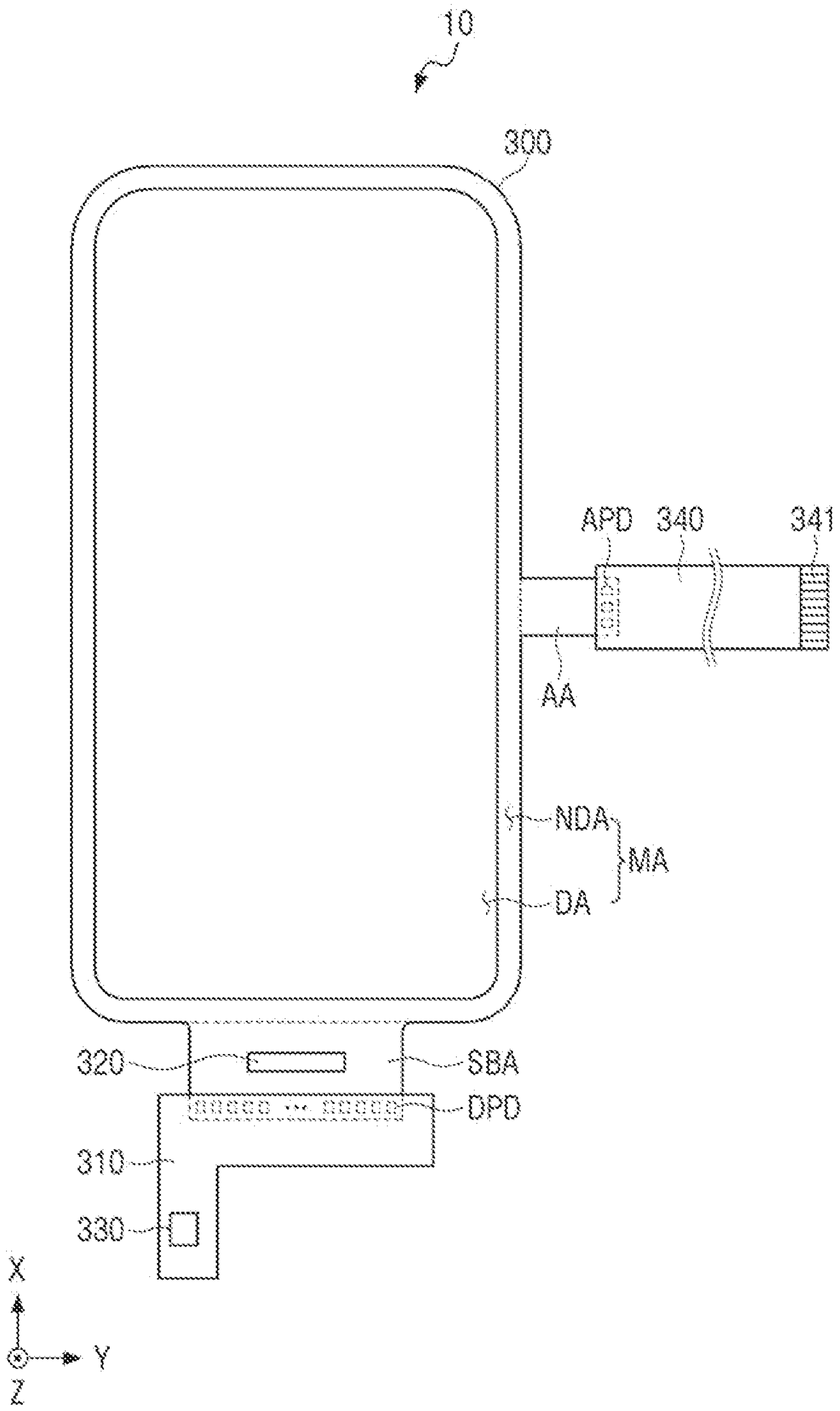

FIG. 5 is a plan view illustrating a display device according to another embodiment. FIG. 6 is a plan view illustrating a display device according to still another embodiment.

The embodiment of FIG. 5 is different from the embodiments of FIGS. 1 and 2 in that the antenna area AA protrudes from the left side of the main area MA in the second direction (Y-axis direction). The embodiment of FIG. 6 is different from the embodiments of FIGS. 1 and 2 in that the antenna area AA protrudes from the right side of the main area MA in the second direction (Y-axis direction). In FIGS. 5 and 6, redundant description of parts already described in the embodiment of FIGS. 1 and 2 will be omitted.

As illustrated in FIGS. 5 and 6, the antenna area AA may protrude from one side of the main area MA, and one side of the main area MA may be one of the upper side, the lower side, the left side, and the right side of the main area MA.

Additionally, the antenna area AA may protrude from the lower side of the main area MA in the second direction (Y-axis direction), and the antenna area AA may be disposed to be spaced apart from the sub-area SBA in the second direction (Y-axis direction). In this case, the length of the antenna area AA in the first direction (X-axis direction) may be smaller than the length of the sub-area SBA in the first direction (X-axis direction), and the length of the antenna area AA in the second direction (Y-axis direction) may be smaller than the length of the sub-area SBA in the second direction (Y-axis direction), but the embodiment of the present specification is not limited thereto.

In the following description, the antenna formed in the antenna area AA and the non-display area NDA adjacent thereto will be described focusing on the embodiments of FIGS. 1 and 2, but characteristics of the antenna described below may also be applied to the embodiments of FIGS. 5 and 6.

Figure 7:
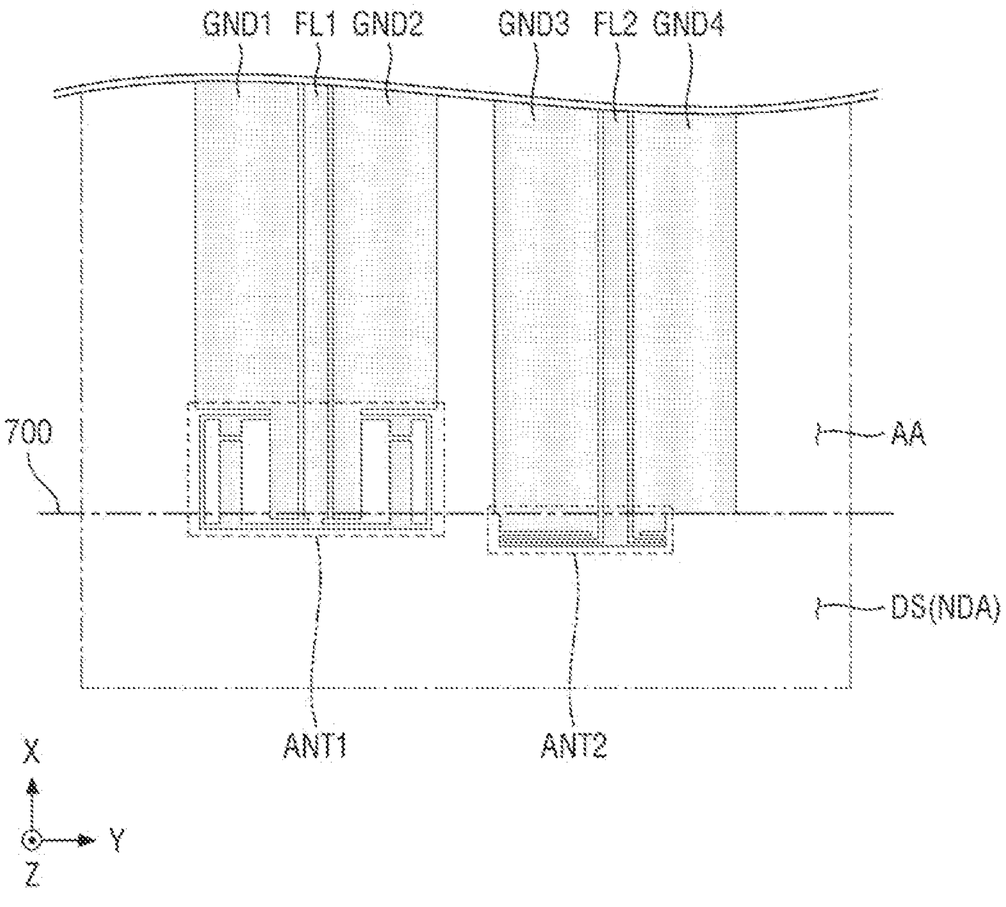
FIG. 7 is a plan view illustrating an example of the antenna area of FIG. 1.
Figure 8:
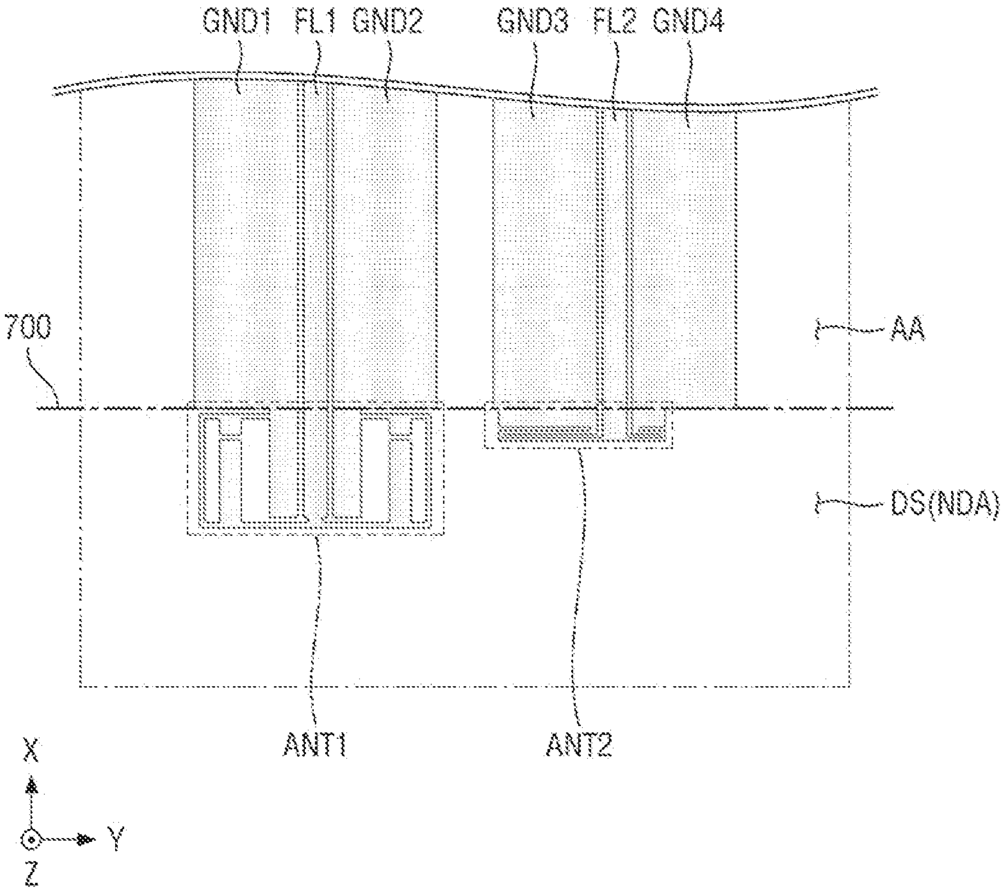
FIG. 8 is a plan view illustrating another example of the antenna area of FIG. 1.

FIG. 7 is a plan view illustrating an example of the antenna area AA of FIG. 1. FIG. 8 is a plan view illustrating another example of the antenna area AA of FIG. 1.

In FIGS. 7 and 8, a dotted line 700 is a virtual boundary line dividing the antenna area AA and the dead space area DS that is the non-display area NDA. In the illustrated example, an area positioned on the upper side of the dotted line 700 represents a part of the antenna area AA, and an area positioned on the lower side of the dotted line 700 represents a part of the dead space area DS that is the non-display area NDA.

According to one embodiment, the display device 10 includes the first antenna ANT1 and the second antenna ANT2 as antennas of an antenna module.

The first antenna ANT1 may be disposed on the boundary between the antenna area AA and the dead space area DS. For example, the first antenna ANT1 may include a first part disposed in the antenna area AA and a second part disposed in the dead space area DS. The first antenna ANT1 may be connected to a first feed line FL1, a first ground line GND1, and a second ground line GND2 formed in the antenna area AA. The first feed line FL1 may be disposed between the first ground line GND1 and the second ground line GND2, and thus may have a ground coplanar waveguide (GCPW) structure. Alternatively, the first feed line FL1 may have a coplanar waveguide (CPW) structure.

The extension direction of each of the first feed line FL1, the first ground line GND1, and the second ground line GND2 may be the same as the extension direction of the antenna area AA. Each of the first feed line FL1, the first ground line GND1, and the second ground line GND2 may be electrically connected to the antenna pads APD (see FIG. 1). For example, each of the first feed line FL1, the first ground line GND1, and the second ground line GND2 may extend in the first direction (X-axis direction), and each end thereof may be connected to the first antenna ANT1.

Referring to FIG. 7, the first antenna ANT1 may be disposed from a part of the dead space area DS to a part of the antenna area AA. For example, the first part of the first antenna ANT1 may be disposed in the antenna area AA adjacent to the dead space area DS, and the second part of the first antenna ANT1 may be disposed in the dead space area DS adjacent to the antenna area AA. However, the area in which the first antenna ANT1 is disposed is not limited to the example of FIG. 7. For example, as illustrated in FIG. 8, the first antenna ANT1 may be solely disposed in the dead space area DS adjacent to the antenna area AA. In addition, the first antenna ANT1 may be solely disposed in a part of the antenna area AA adjacent to the dead space area DS.

The width of the first antenna ANT1 may be equal to or less than a half-wavelength length for about 28 GHZ (e.g., equal to or less than about 4.8 mm), and optimization of the resonance point of the structure for about 28 GHz may be adjusted through tuning of the width or the length of antenna electrodes AE1, AE2, and AE3 (see FIG. 13) of the first antenna ANT1. The first antenna ANT1 may have a structure of a half-wavelength slot antenna, and may generate a field parallel to the first direction (X-axis direction) through an LC parallel type structure or a loop type structure at both ends thereof in the second direction (Y-axis direction). The first antenna ANT1 may include an antenna structure symmetrical with respect to the first feed line FL1. For example, the first antenna ANT1 may include an antenna structure that is left-right symmetric with respect to the first feed line FL1. Here, the antenna structure may be a structure including the antenna electrodes AE1, AE2, and AE3 (see FIG. 13) forming the first antenna ANT1, at least one of slots S1, S2, and CS (see FIG. 13) formed inside the antenna electrodes AE1, AE2, and AE3 (see FIG. 13), or at least one slit. In addition, the slot or the slit may be an area in which metal forming the antenna electrodes AE1, AE2, and AE3 (see FIG. 13) is not formed. The antenna structure constituting the first antenna ANT1 will be described later specifically in conjunction with FIGS. 13 to 15.

The second antenna ANT2 may be disposed in the dead space area DS adjacent to the antenna area AA, and may be connected to a second feed line FL2, a third ground line GND3, and a fourth ground line GND4 formed in the antenna area AA. The second feed line FL2 may be disposed between the third ground line GND3 and the fourth ground line GND4, and thus may have a ground coplanar waveguide (GCPW) structure. Alternatively, the second feed line FL2 may have a coplanar waveguide (CPW) structure.

The extension direction of each of the second feed line FL2, the third ground line GND3, and the fourth ground line GND4 may be the same as the extension direction of the antenna area AA. Each of the second feed line FL2, the third ground line GND3, and the fourth ground line GND4 may be electrically connected to the antenna pads APD (see FIG. 1). For example, each of the second feed line FL2, the third ground line GND3, and the fourth ground line GND4 may extend in the first direction (X-axis direction), and each end thereof may be connected to the second antenna ANT2.

Referring to FIG. 7, the second antenna ANT2 may be disposed solely in the dead space area DS adjacent to the antenna area AA, but the area in which the second antenna ANT2 is disposed is not limited to the illustrated example. For example, the second antenna ANT2 may be disposed solely in a part of the antenna area AA adjacent to the dead space area DS, or in both parts of the antenna area AA and the dead space area DS.

The second antenna ANT2 may include a structure obtained by tuning the shape of a dipole antenna, which is folded within the same length as the polarization structure of the first antenna ANT1. The second antenna ANT2 may include an asymmetrical antenna structure with respect to the second feed line FL2 to generate a field in the second direction (Y-axis direction) perpendicular to the first direction (X-axis direction). Here, the antenna structure may be a structure including the antenna electrodes AE4, AE5, and AE6 (see FIG. 16) forming the second antenna ANT2, at least one of slots S3 and S4 (see FIG. 16) formed inside the antenna electrodes AE4, AE5, and AE6 (see FIG. 16), or at least one slit. In addition, the slot or the slit may be an area in which metal forming the antenna electrodes AE4, AE5, and AE6 (see FIG. 16) is not formed. The antenna structure constituting the second antenna ANT2 will be described later specifically in conjunction with FIGS. 16 to 18.

The first antenna ANT1 and the second antenna ANT2 may be disposed adjacent to each other in the second direction (Y-axis direction). The interval between the first antenna ANT1 and the second antenna ANT2, in other words, the interval between the port of the first antenna ANT1 and the port of the second antenna ANT2 may be about 0.52 (e.g., half wavelength, about 5.3 mm or less) at about 28 GHz, and a minimum of about 0.252 (e.g., half wavelength, about 2.65 mm) at about 28 GHz.

Figure 9:
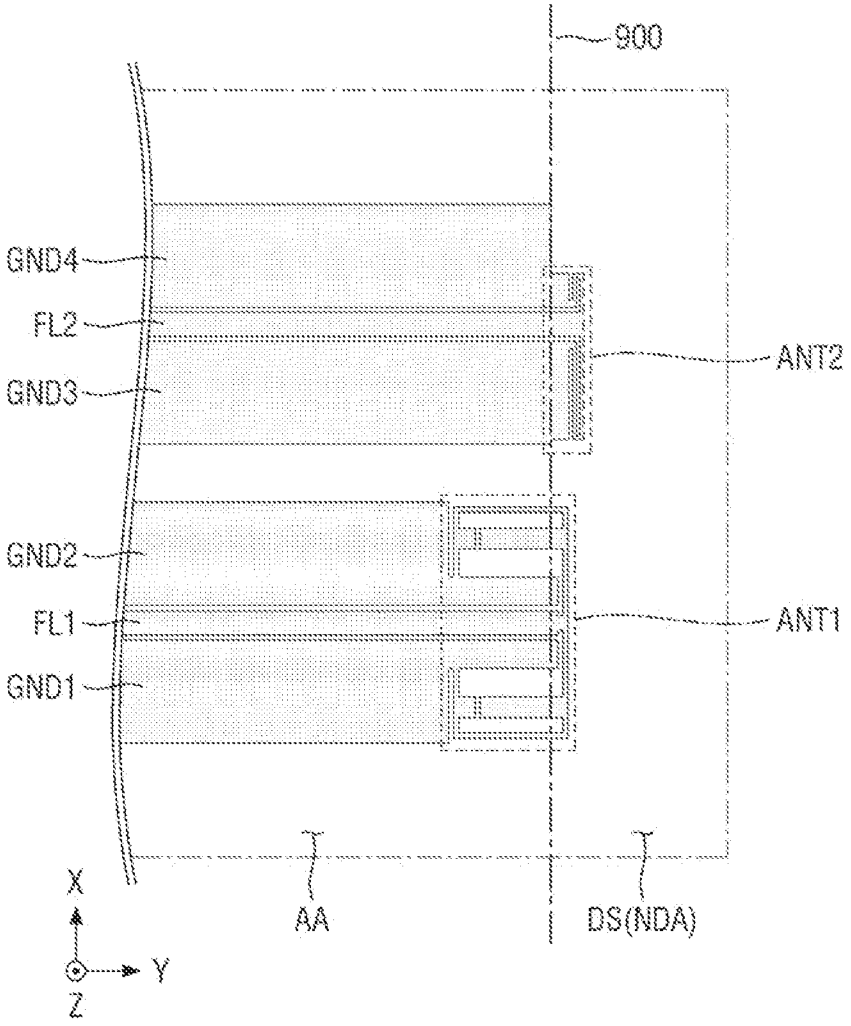
FIG. 9 is a plan view illustrating an example of the antenna area of FIG. 5.

FIG. 9 is a plan view illustrating an example of the antenna area AA of FIG. 5.

The embodiment of FIG. 9 is different from the embodiments of FIGS. 7 and 8 in that the antenna area AA protrudes in the second direction (Y-axis direction) from the left side of the main area MA. The embodiment of FIG. 9 is different from the embodiments of FIGS. 1 and 2 in that the antenna area AA protrudes in the second direction (Y-axis direction) from the left side of the main area MA. In FIG. 9, redundant description of parts already described in the embodiment of FIGS. 7 and 8 will be omitted.

Referring to FIG. 9, a dotted line 900 is a virtual boundary line dividing the antenna area AA and the dead space area DS that is the non-display area NDA. In the illustrated example, an area positioned on the left side of the dotted line 900 represents a part of the antenna area AA, and an area positioned on the right side of the dotted line 900 represents a part of the dead space area DS that is the non-display area NDA.

As illustrated in FIG. 9, the extension direction of each of the first feed line FL1, the first ground line GND1, and the second ground line GND2 may be the same as the extension direction of the antenna area AA. Each of the first feed line FL1, the first ground line GND1, and the second ground line GND2 may be electrically connected to the antenna pads APD (see FIG. 5). For example, each of the first feed line FL1, the first ground line GND1, and the second ground line GND2 may extend in the second direction (Y-axis direction), and each end thereof may be connected to the first antenna ANT1.

In addition, the extension direction of each of the second feed line FL2, the third ground line GND3, and the fourth ground line GND4 may be the same as the extension direction of the antenna area AA. Each of the second feed line FL2, the third ground line GND3, and the fourth ground line GND4 may be electrically connected to the antenna pads APD (see FIG. 5). For example, each of the second feed line FL2, the third ground line GND3, and the fourth ground line GND4 may extend in the second direction (Y-axis direction), and each end thereof may be connected to the second antenna ANT2.

The first antenna ANT1 and the second antenna ANT2 may be disposed adjacent to each other in the first direction (X-axis direction). The interval between the first antenna ANT1 and the second antenna ANT2, in other words, the interval between the port of the first antenna ANT1 and the port of the second antenna ANT2 may be about 0.5λ (e.g., half wavelength, about 5.3 mm or less) at about 28 GHz, and a minimum of about 0.25λ (e.g., half wavelength, about 2.65 mm) at about 28 GHz. An interval between a port of the first antenna ANT1 and a port of the second antenna ANT2 may be an interval between the first feed line FL1 and the second feed line FL2.

According to the present disclosure, the number of arrangements of the first antenna ANT1 and the second antenna ANT2 may be variously changed. In addition, the shape of the arrangement of the first antenna ANT1 and the second antenna ANT2 may be variously changed. This will be described in detail with reference to FIGS. 10 to 12.

Figure 10:
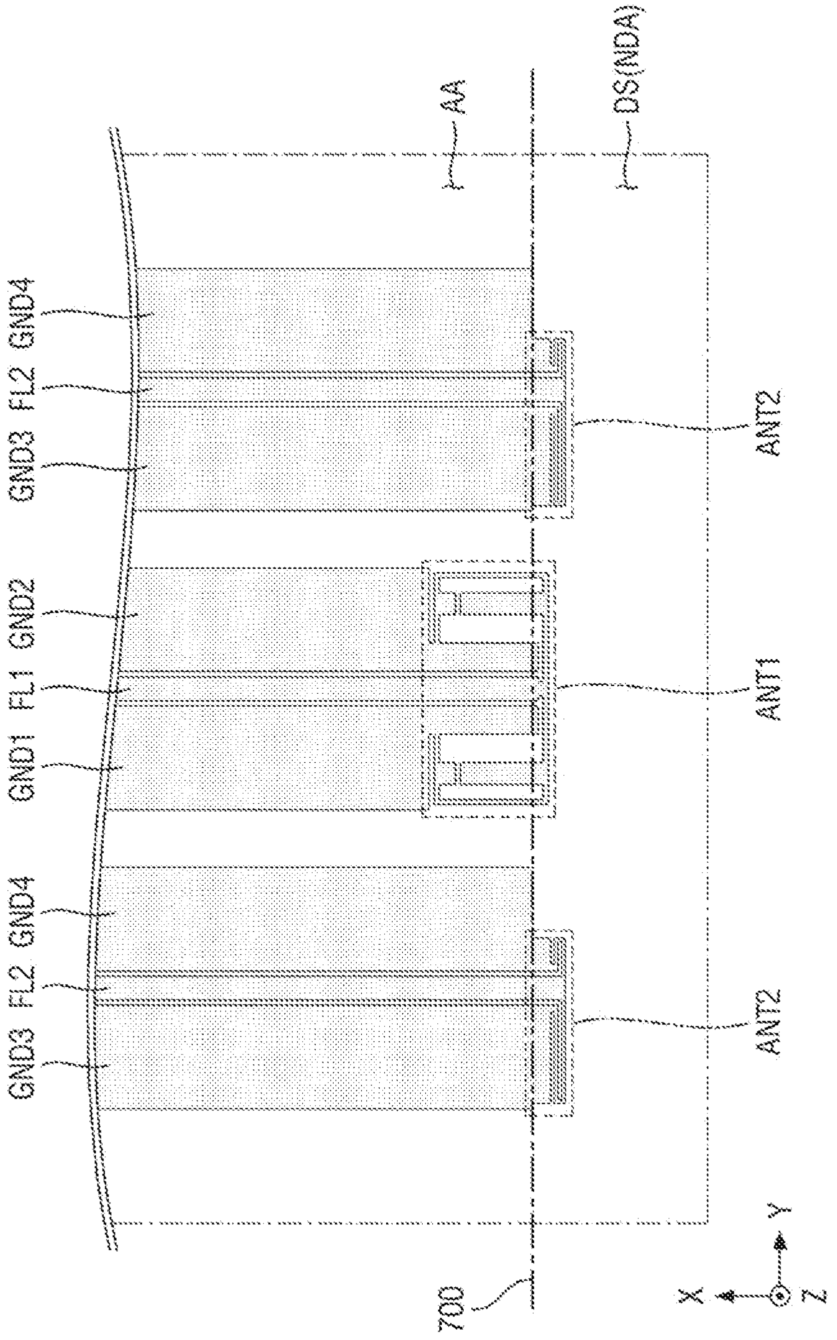
FIG. 10 is a plan view illustrating the antenna area including a 1X2Y antenna unit according to one embodiment.

FIG. 10 is a plan view illustrating the antenna area AA including a 1X2Y antenna unit according to one embodiment.

The embodiment of FIG. 10 may be at least partially similar to the embodiment of FIG. 7. Hereinafter, only the configuration of the embodiment of FIG. 10 that is different from that of the embodiment of FIG. 7 will be described.

Referring to FIG. 10, the display device 10 according to one embodiment may include a 1X2Y antenna unit including one X-axis polarization antenna and two Y-axis polarization antennas. For example, the display device 10 according to one embodiment may include the first antenna ANT1 as an X-axis polarization antenna, and may further include the second antenna ANT2 as a Y-axis polarization antenna. In this case, the second antenna ANT2 may be disposed on both sides of the first antenna ANT1. For example, the second antenna ANT2 may be disposed on each of the left side and the right side of the first antenna ANT1.

In the embodiment of FIG. 10, as an interval between different kinds of antennas, e.g., the interval between the first antenna ANT1 and the second antenna ANT2, the interval between the port of the first antenna ANT1 and the port of the second antenna ANT2 may be about 0.5λ (e.g., half wavelength, about 5.3 mm or less) at about 28 GHz, and a minimum of about 0.25λ (e.g., half wavelength, about 2.65 mm) at about 28 GHz. An interval between a port of the first antenna ANT1 and a port of the second antenna ANT2 may be an interval between the first feed line FL1 and the second feed line FL2.

Additionally, the interval between the antennas of the same type, e.g., the interval between the second antennas ANT2 disposed on both sides of the first antenna ANT1 is about 7 mm or less at about 28 GHz. The interval between the second antennas ANT2 may be the interval between the second feed lines FL2 connected to each of the second antennas ANT2.

Figure 11:
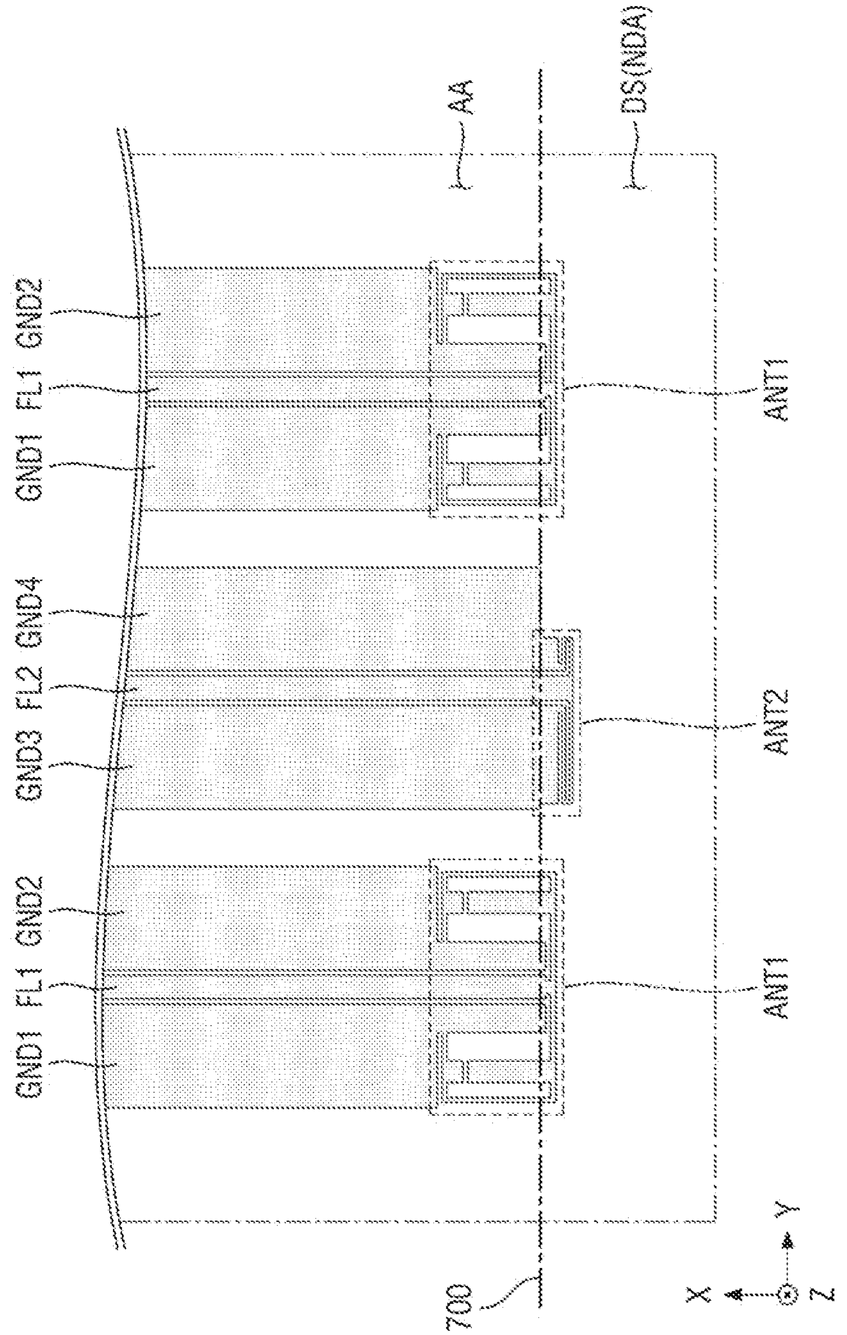
FIG. 11 is a plan view illustrating the antenna area including a 2X1Y antenna unit according to one embodiment.

FIG. 11 is a plan view illustrating the antenna area AA including a 2X1Y antenna unit according to one embodiment.

The embodiment of FIG. 11 may be at least partially similar to the embodiments of FIGS. 7 and 10. Hereinafter, only the configuration of the embodiment of FIG. 11 that is different from those of the embodiments of FIGS. 7 and 10 will be described.

Referring to FIG. 11, the display device 10 according to one embodiment may include a 2X1Y antenna unit including two X-axis polarization antennas and one Y-axis polarization antenna. For example, the display device 10 according to one embodiment may include the first antenna ANT1 as an X-axis polarization antenna, and may further include the second antenna ANT2 as a Y-axis polarization antenna. In this case, the first antenna ANT1 may be disposed on both sides of the second antenna ANT2. For example, the first antenna ANT1 may be disposed on each of the left side and the right side of the second antenna ANT2.

In the embodiment of FIG. 11, as an interval between different kinds of antennas, e.g., the interval between the first antenna ANT1 and the second antenna ANT2, the interval between the port of the first antenna ANT1 and the port of the second antenna ANT2 may be about 0.5λ (e.g., half wavelength, about 5.3 mm or less) at about 28 GHz, and a minimum of about 0.25λ (e.g., half wavelength, about 2.65 mm) at about 28 GHz. An interval between a port of the first antenna ANT1 and a port of the second antenna ANT2 may be an interval between the first feed line FL1 and the second feed line FL2.

Additionally, the interval between the antennas of the same type, e.g., the interval between the first antennas ANT1 disposed on both sides of the second antenna ANT2 is about 7 mm or less at about 28 GHz. The interval between the first antennas ANT1 may be the interval between the first feed lines FL1 connected to each of the first antennas ANT1.

Figure 12:
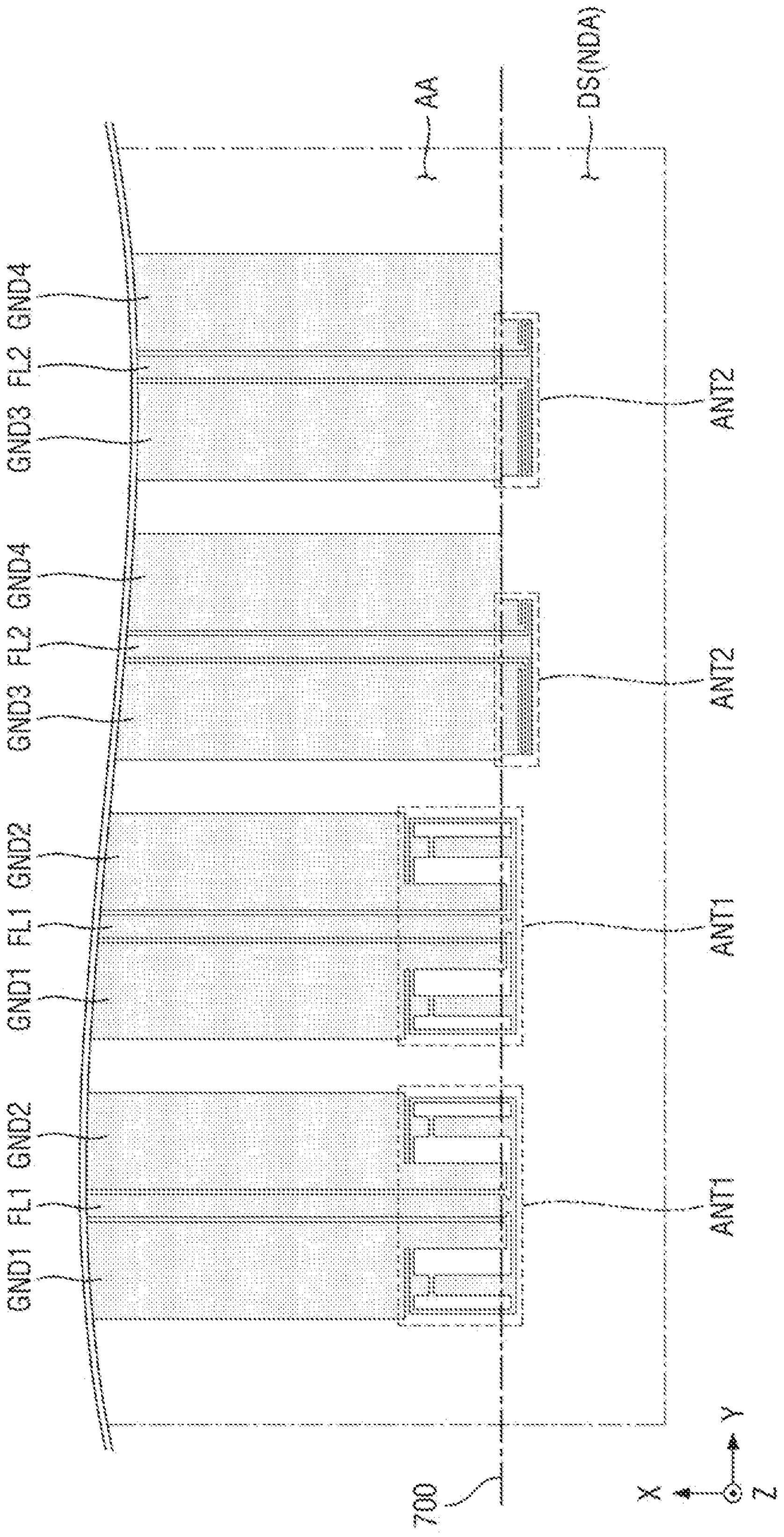
FIG. 12 is a plan view illustrating the antenna area including a 2X2Y antenna unit according to one embodiment.

FIG. 12 is a plan view illustrating the antenna area AA including a 2X2Y antenna unit according to one embodiment.

The embodiment of FIG. 12 may be at least partially similar to the embodiments of FIGS. 7 and 10. Hereinafter, only the configuration of the embodiment of FIG. 12 that is different from those of the embodiments of FIGS. 7 and 10 will be described.

Referring to FIG. 12, the display device 10 according to one embodiment may include a 2X2Y antenna unit including two X-axis polarization antennas and two Y-axis polarization antennas. For example, the display device 10 according to one embodiment may include the first antenna ANT1 as an X-axis polarization antenna, and may further include the second antenna ANT2 as a Y-axis polarization antenna. In this case, the first antennas ANT1 may form one first antenna group and be disposed adjacent to each other, and the second antennas ANT2 may form one second antenna group and be disposed adjacent to each other A first antenna group constituted with the first antennas ANT1 and a second antenna group constituted with the second antennas ANT2 may be disposed adjacent to each other, and the interval between the groups may be designed to be various values in consideration of impedance matching.

A simulation result of the characteristics of the first antenna group constituted with the first antennas ANT1 is as follows. When the first antenna ANT1 was designed as a 1×2 array antenna, it was confirmed to have a peak gain of about 4.1 dBi at about 28 GHz. In addition, when the first antenna ANT1 was designed as a 1×4 array antenna, it was confirmed to have a peak gain of about 7.01 dBi at about 28 GHz. In this case, the first antennas ANT1 of the first antenna group may have an interval of about 5 mm (28 GHz half-wavelength) at equal intervals, and the gain may decrease by about 1 dB as the interval increases. In addition, the first antenna group may operate at about 25 GHz to about 28.7 GHZ and about 3.7 GHZ, and a cross-polarization discrimination XPD may be up to 45 dB at maximum.

Additionally, as illustrated in FIG. 12, when the first antenna group constituted with the first antennas ANT1 and the second antenna group constituted with the second antennas ANT2 are disposed adjacent to each other, it was confirmed that, at about 27 GHZ, the X-axis-polarization had a peak gain of 4.4 dBi and the Y-axis-polarization had a peak gain of about 1.9 dBi.

Figure 13:
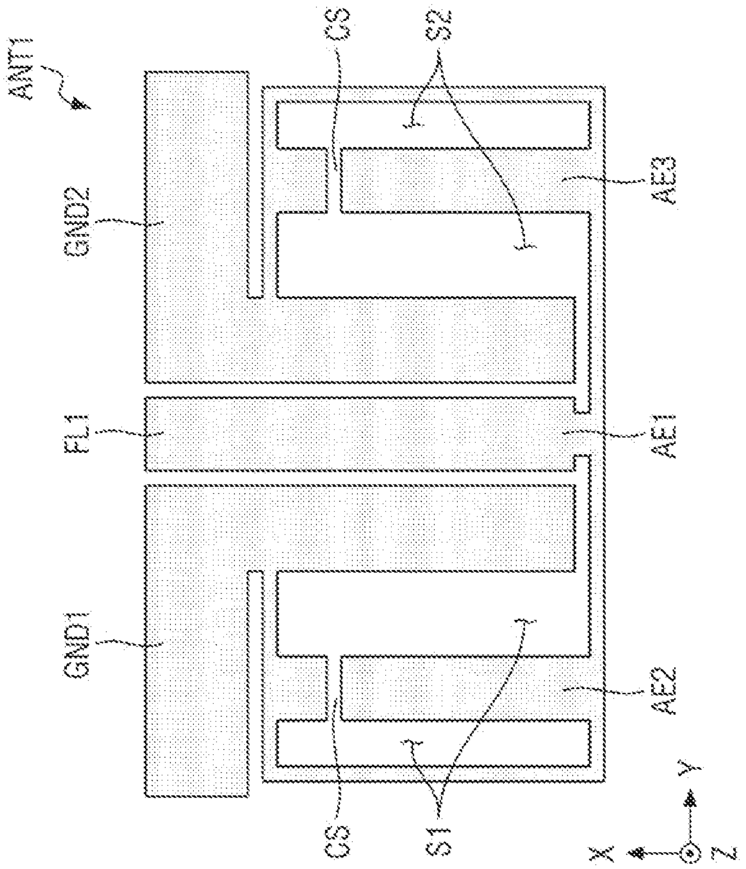
FIG. 13 is a plan view illustrating the first antenna according to one embodiment.
Figure 14:
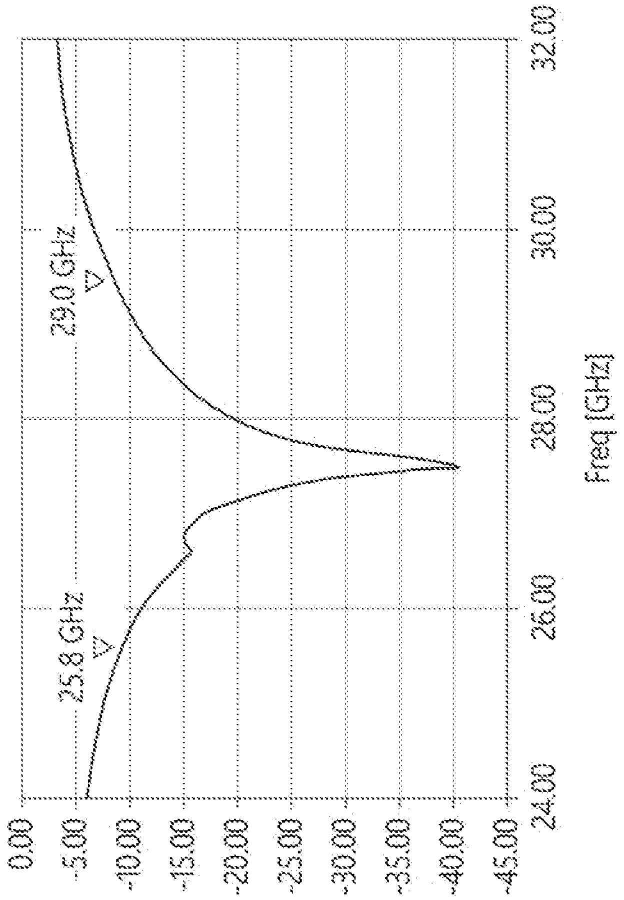
FIG. 14 is a diagram illustrating a characteristic graph of the first antenna according to one embodiment.
Figure 15:
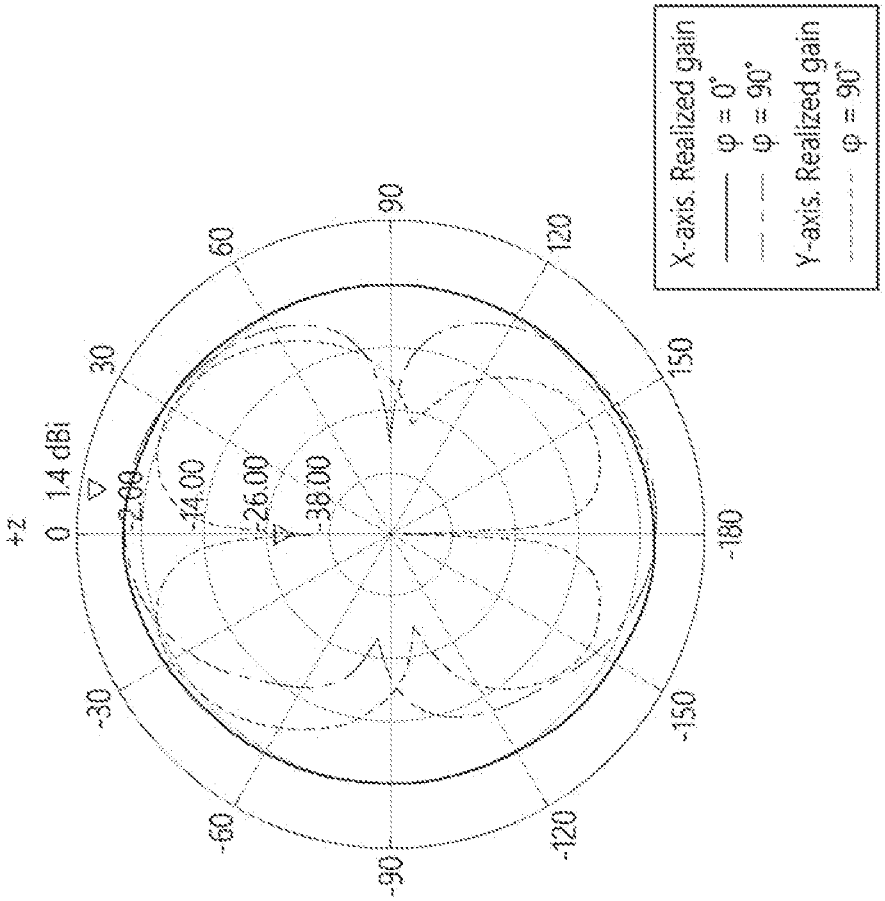
FIG. 15 is a diagram illustrating a radiation pattern of the first antenna according to one embodiment.

FIG. 13 is a plan view illustrating the first antenna ANT1 according to one embodiment. FIG. 14 is a diagram illustrating a characteristic graph of the first antenna ANT1 according to one embodiment. FIG. 15 is a diagram illustrating a radiation pattern of the first antenna ANT1 according to one embodiment.

Referring to FIG. 13, the first antenna ANT1 according to one embodiment may include the first antenna electrode AE1, the second antenna electrode AE2, and the third antenna electrode AE3. The first antenna electrode AE1 may be disposed between the second antenna electrode AE2 and the third antenna electrode AE3. The second antenna electrode AE2 is branched from one end of the first antenna electrode AE1 in one direction (e.g., −Y direction) and is connected to the first ground line GND1. The third antenna electrode AE3 is branched from one end of the first antenna electrode AE1 in the other direction (e.g., Y direction) and is connected to the second ground line GND2. For example, the second antenna electrode AE2 may be branched from a first end of the first antenna electrode AE1 and the third antenna electrode AE3 may be branched from a second end of the first antenna electrode AE1. The second antenna electrode AE2 and the third antenna electrode AE3 may have symmetrical shapes with respect to the first antenna electrode AE1.

The second antenna electrode AE2 and the third antenna electrode AE3 may include at least one slot S1 and at least one slot S2, respectively, and the slot S1 of the second antenna electrode AE2 and the slot S2 of the third antenna electrode AE3 may be disposed symmetrically with respect to the first antenna electrode AE1.

The slots S1 and S2 respectively included in the second antenna electrode AE2 and the third antenna electrode AE3 may have lengths extending in the first direction (X-axis direction), and the length and width thereof may be variously changed in consideration of impedance matching. According to the illustrated example, the second antenna electrode AE2 may include a plurality of first slots S1 having a length extending in the first direction (X-axis direction), and the third antenna electrode AE3 may include a plurality of second slots S2 having a length extending in the first direction (X-axis direction) and disposed symmetrically with the plurality of first slots S1.

The width of each of the plurality of first slots S1 included in the first antenna electrode AE1 may be the same as or different from each other. The plurality of first slots S1 included in the first antenna electrode AE1 may be connected to each other by the connection slot CS extending in the second direction (Y-axis direction). Similarly, the width of each of the plurality of second slots S2 included in the second antenna electrode AE2 may be the same as or different from each other, and the plurality of second slots S2 may be connected to each other by the connection slot CS extending in the second direction (Y-axis direction). Portions of the first and second slots S1 and S2 may extend to the first feed line FL1 and run adjacent to the first feed line FL1 in the first direction.

Referring to FIGS. 14 and 15, the first antenna ANT1, which is an X-axis polarization antenna, may have a peak gain of a maximum of 1.4 dBi at about 28 GHz, and an operating frequency of about 25.8 GHz to about 29 GHz or about 3 GHz. When the first antenna ANT1 is designed as a single antenna, the cross-polarization discrimination XPD may have a maximum of about 35 dB in a direction perpendicular to the display surface of the display device 10.

Figure 16:
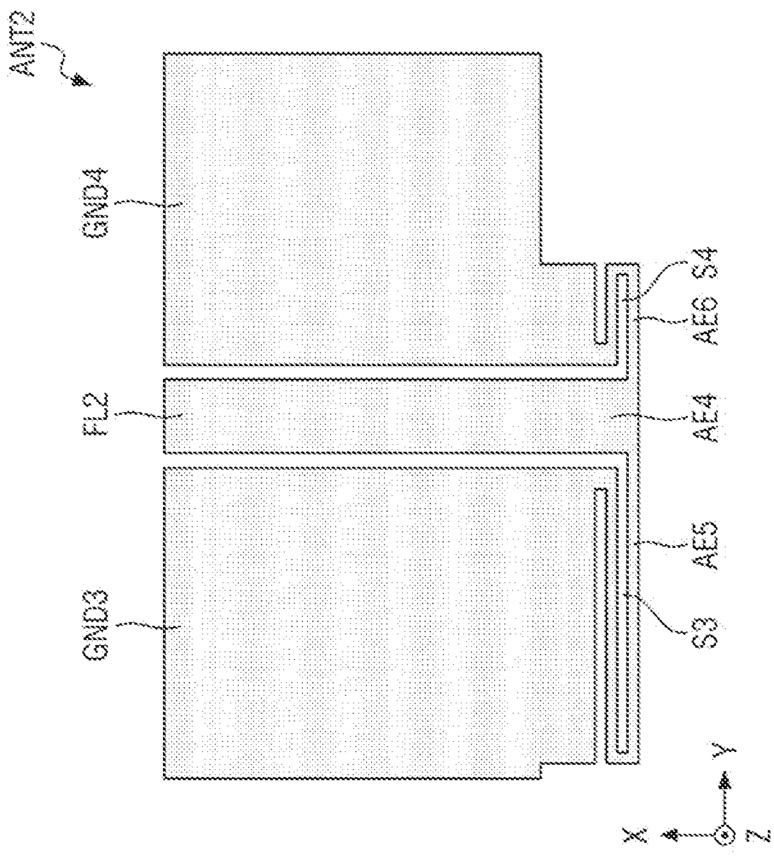
FIG. 16 is a plan view showing the second antenna according to one embodiment.
Figure 17:
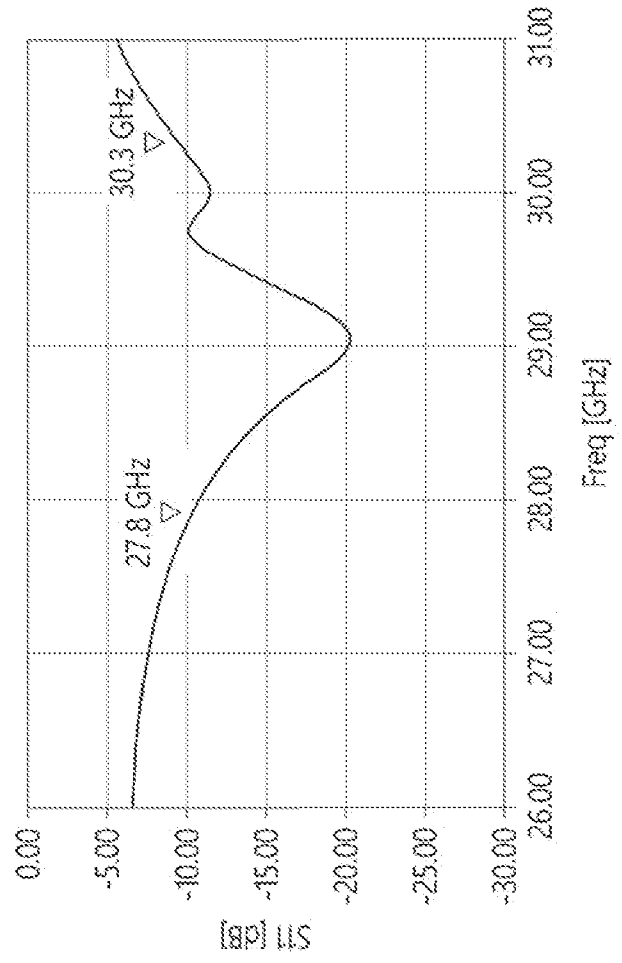
FIG. 17 is a diagram illustrating a characteristic graph of the second antenna according to one embodiment.
Figure 18:
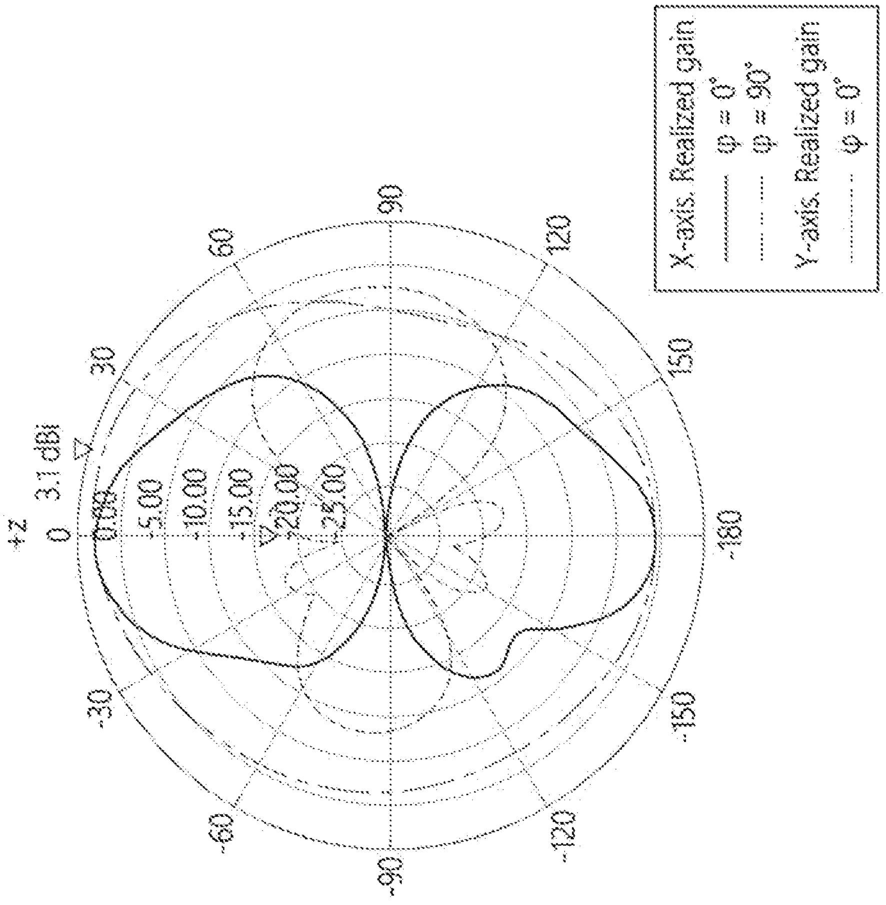
FIG. 18 is a diagram illustrating a radiation pattern of the second antenna according to one embodiment.

FIG. 16 is a plan view showing the second antenna ANT2 according to one embodiment. FIG. 17 is a diagram illustrating a characteristic graph of the second antenna ANT2 according to one embodiment. FIG. 18 is a diagram illustrating a radiation pattern of the second antenna ANT2 according to one embodiment.

Referring to FIG. 16, the second antenna ANT2 according to one embodiment may include the fourth antenna electrode AE4, the fifth antenna electrode AE5, and the sixth antenna electrode AE6. The fourth antenna electrode AE4 may be disposed between the fifth antenna electrode AE5 and the sixth antenna electrode AE6. The fifth antenna electrode AES is branched from one end of the fourth antenna electrode AE4 in one direction (e.g., −Y direction) and is connected to the third ground line GND3. The sixth antenna electrode AE6 is branched from one end of the fourth antenna electrode AE4 in the other direction (e.g., Y direction) and is connected to the fourth ground line GND4. For example, the fifth antenna electrode AES is branched from a first end of the fourth antenna electrode AE4 and the sixth antenna electrode AE6 is branched from a second end of the fourth antenna electrode AE4. The fifth antenna electrode AE5 and the sixth antenna electrode AE6 may have an asymmetric shape with respect to the fourth antenna electrode AE4. For example, the length of the fifth antenna electrode AES in the second direction (Y-axis direction) may be longer than the length of the sixth antenna electrode AE6 in the second direction (Y-axis direction). Conversely, the length of the fifth antenna electrode AES in the second direction (Y-axis direction) may be shorter than the length of the sixth antenna electrode AE6 in the second direction (Y-axis direction).

The fifth antenna electrode AES and the sixth antenna electrode AE6 may respectively include the slots S3 and S4 having lengths extending in the second direction (Y-axis direction), and the slot S3 of the fifth antenna electrode AE5 and the slot S4 of the sixth antenna electrode AE6 may be disposed asymmetrically with respect to the fourth antenna electrode AE4. For example, the fifth antenna electrode AES may include the third slot S3, and the sixth antenna electrode AE6 may include the fourth slot S4 having a shorter length than the third slot S3.

The slots S3 and S4 respectively included in the fifth antenna electrode AE5 and the sixth antenna electrode AE6 may have lengths extending in the second direction (Y-axis direction), and the length and width thereof may be variously changed in consideration of impedance matching. Portions of the third and fourth slots S3 and S4 may extend to the second feed line FL2 and run adjacent to the second feed line FL2 in the first direction.

Referring to FIGS. 17 and 18, the second antenna ANT2, which is a Y-axis polarization antenna, may have the following characteristics within the same length as the first antenna ANT1. In other words, the second antenna ANT2 may have a peak gain of a maximum of 3.1 dBi at about 29 GHz, and may have an operating frequency of about 25.8 GHz to about 29 GHz or about 2.5 GHz. When the second antenna ANT2 is designed as a single antenna, in the case of a single antenna, the cross-polarization discrimination XPD may have a maximum of 18 dB in a direction perpendicular to the display surface.

According to the present disclosure, the structure and shape of the first antenna ANT1 may be variously changed. For example, unlike the embodiment of FIG. 13, in the first antenna ANT1, an X-axis polarization may be formed in a loop structure, a slot or a slit may be added, or a part of an antenna electrode may be tapered for impedance matching to supply power. This will be described in detail with reference to FIGS. 19 to 21.

Figure 19:
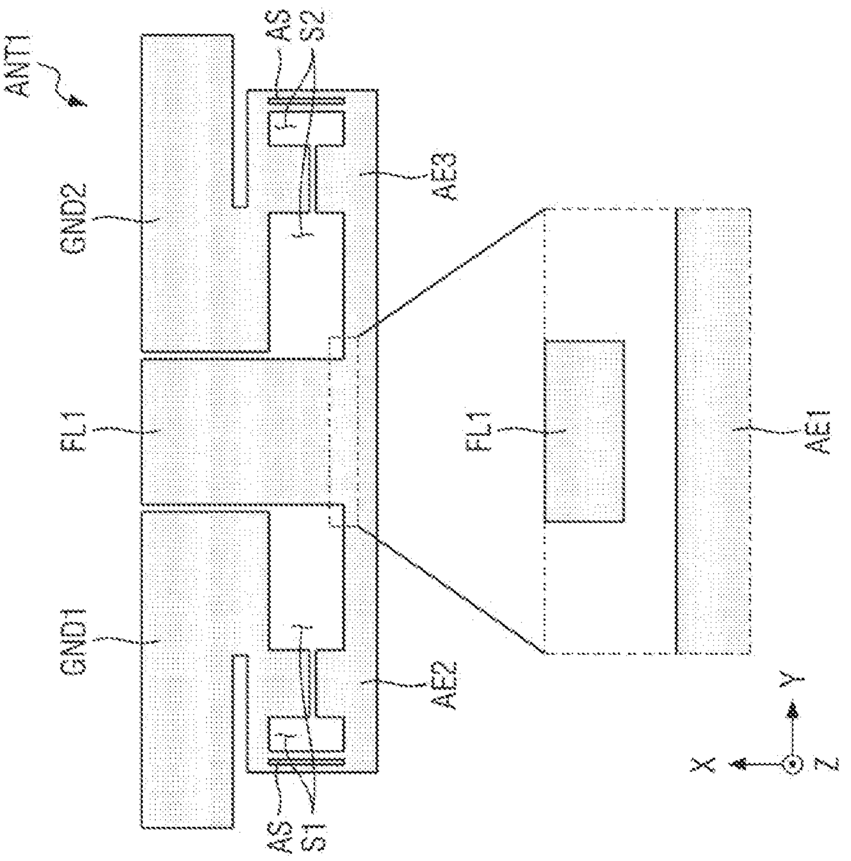
FIG. 19 is a plan view showing the first antenna according to another embodiment.

FIG. 19 is a plan view showing the first antenna ANT1 according to another embodiment.

The embodiment of FIG. 19 may be at least partially similar to the embodiment of FIG. 13. Hereinafter, only the configuration of the embodiment of FIG. 19 that is different from that of the embodiment of FIG. 13 will be described.

Referring to FIG. 19, in the first antenna ANT1, each of the second antenna electrode AE2 and the third antenna electrode AE3 may further include an additional slot AS. For example, the additional slot AS may have a length extending in the first direction (X-axis direction), and the length and width thereof may be variously changed in consideration of impedance matching.

In addition, the first feed line FL1 and the first antenna electrode AE1 are spaced apart from each other at a predetermined interval, so that the first antenna ANT1 may have a capacitive-fed form. For example, the interval between the first feed line FL1 and the first antenna electrode AE1 may be designed to be an interval of about 10 μm, about 20 μm, or about 50 μm, but the present disclosure is not limited thereto.

Figure 20:
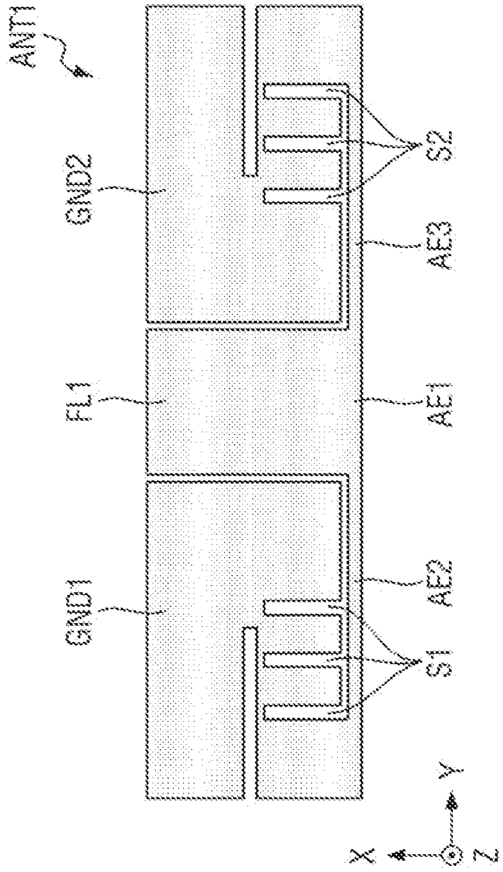
FIG. 20 is a plan view showing the first antenna according to still another embodiment.

FIG. 20 is a plan view showing the first antenna ANT1 according to still another embodiment.

The embodiment of FIG. 20 may be at least partially similar to the embodiment of FIG. 13. Hereinafter, only the configuration of the embodiment of FIG. 20 that is different from that of the embodiment of FIG. 13 will be described.

The embodiment of FIG. 20 is different from the embodiment of FIG. 13 in that the connection slot CS (see FIG. 13) is omitted from each of the second antenna electrode AE2 and the third antenna electrode AE3 and the number of the slots S1 having a length extending in the first direction (X-axis direction) is increased. For example, each of the second antenna electrode AE2 and the third antenna electrode AE3 may include the three slots S1 having lengths extending in the first direction (X-axis direction), and the three slots S1 may be disposed side by side in the first direction (X-axis direction).

Figure 21:
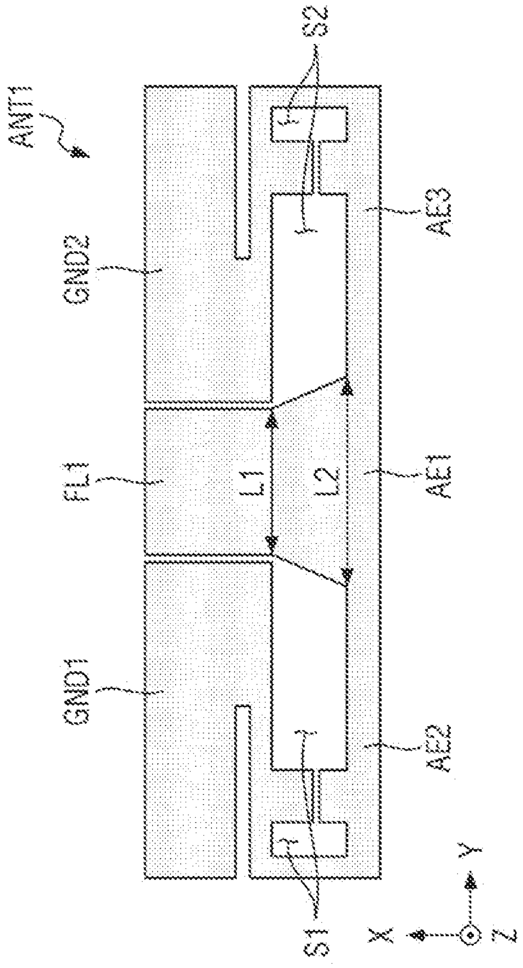
FIG. 21 is a plan view showing the first antenna according to still another embodiment.

FIG. 21 is a plan view showing the first antenna ANT1 according to still another embodiment.

The embodiment of FIG. 21 may be at least partially similar to the embodiment of FIG. 13. Hereinafter, only the configuration of the embodiment of FIG. 21 that is different from that of the embodiment of FIG. 13 will be described.

The embodiment of FIG. 21 is different from the embodiment of FIG. 13 in that the first antenna electrode AE1 may be formed to be inclined (e.g., have a tapered shape) to supply power. For example, the first antenna electrode AE1 has a first width L1 in a region closest to the first feed line FL1 and has a second width L2 greater than the first width L1 in a region (or in a region in which the second antenna electrode AE2 and the third antenna electrode AE3 are branched) farthest from the first feed line FL1. In this case, the difference between the first width L1 and the second width L2 may be designed to be within about 0.5 mm.

It is to be understood that the embodiments of FIG. 13 and FIGS. 19 to 21 are combinable with each other.

Figure 22:
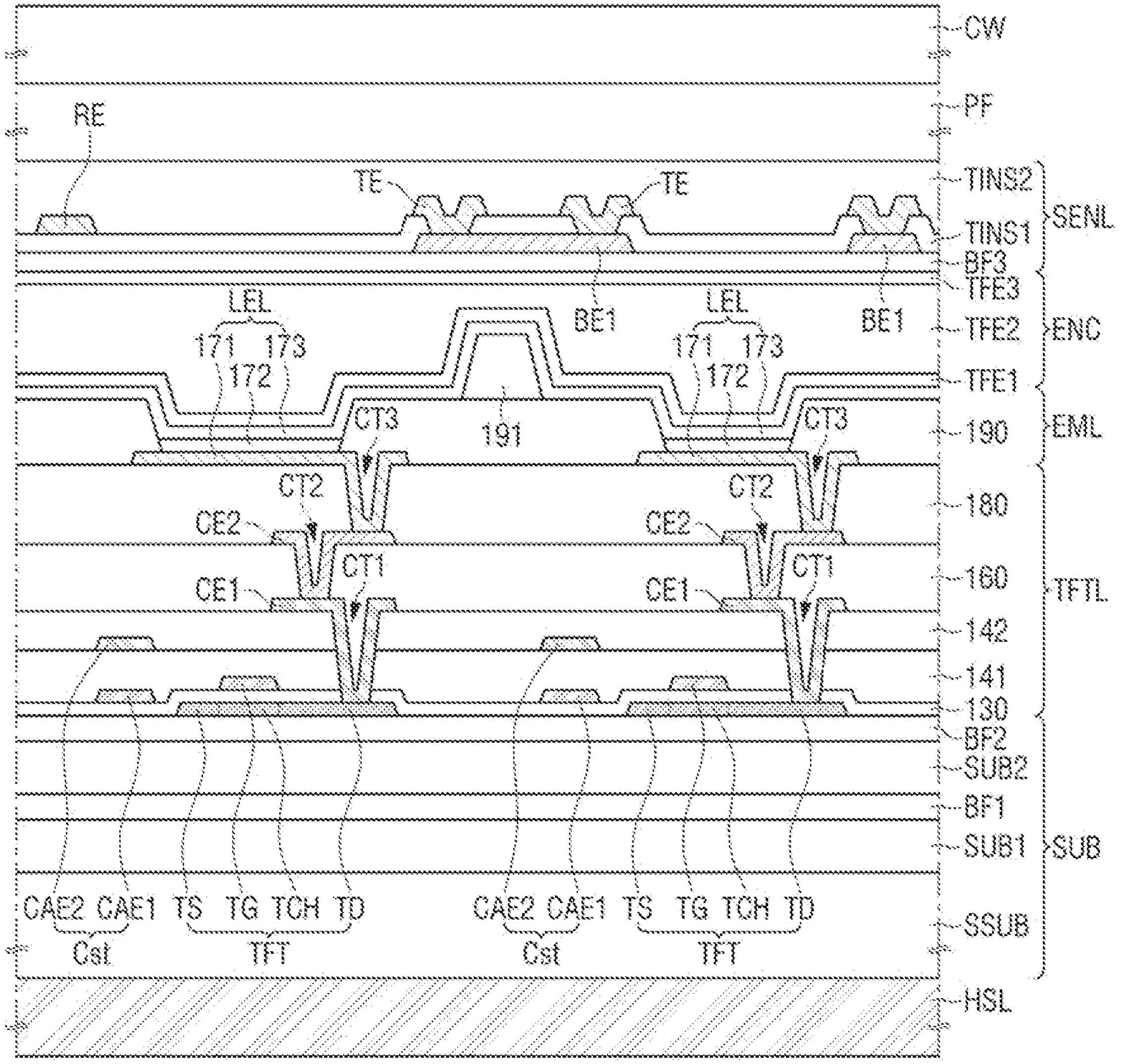
FIG. 22 is a cross-sectional view of a part of the display area of the display device according to one embodiment.

FIG. 22 is a cross-sectional view of a part of the display area of the display device 10 according to one embodiment.

Referring to FIG. 22, the display layer DISL including a thin film transistor layer TFTL and a light emitting element layer EML may be disposed on one surface of the substrate SUB, and the sensor electrode layer SENL including sensor electrodes SE may be disposed on the encapsulation layer ENC. The polarizing film PF may be disposed on the sensor electrode layer SENL, and the cover window CW may be disposed on the polarizing film PF.

The substrate SUB may include a support substrate SSUB, a first substrate SUB1, a first buffer layer BF1, a second substrate SUB2, and a second buffer layer BF2. The first substrate SUB1 may be disposed on the support substrate SSUB, the first buffer layer BF1 may be disposed on the first substrate SUB1, the second substrate SUB2 may be disposed on the first buffer layer BF1, and the second buffer layer BF2 may be disposed on the second substrate SUB2.

The support substrate SSUB may be a rigid substrate for supporting the first substrate SUB1 and the second substrate SUB2 that are flexible. The support substrate SSUB may be formed of glass or a plastic material such as polycarbonate (PC) and polyethylene terephthalate (PET).

The first substrate SUB1 and the second substrate SUB2 may be formed of an organic material such as acryl resin, epoxy resin, phenolic resin, polyamide resin, polyimide resin and the like. The first substrate SUB1 and the second substrate SUB2 may be formed of the same organic material or different organic materials.

Each of the first buffer layer BF1 and the second buffer layer BF2 may be formed of an inorganic material such as a silicon nitride layer, a silicon oxynitride layer, a silicon oxide layer, a titanium oxide layer and an aluminum oxide layer. Alternatively, each of the first buffer layer BF1 and the second buffer layer BF2 may be formed of a multilayer in which a plurality of layers of a silicon nitride layer, a silicon oxynitride layer, a silicon oxide layer, a titanium oxide layer and an aluminum oxide layer are alternately stacked. The first buffer layer BF1 and the second buffer layer BF2 may be formed of the same inorganic material or different inorganic materials.

An active layer including a channel region TCH, a source region TS, and a drain region TD of a thin film transistor TFT may be disposed on the second buffer layer BF2. The active layer may include polycrystalline silicon, monocrystalline silicon, low-temperature polycrystalline silicon, amorphous silicon, or an oxide semiconductor material. When the active layer includes polycrystalline silicon or an oxide semiconductor material, the source region TS and the drain region TD of the active layer may be conductive regions doped with ions and having conductivity.

A gate insulating layer 130 may be formed on the active layer of the thin film transistor TFT. The gate insulating layer 130 may be formed of an inorganic layer, for example, a silicon nitride layer, a silicon oxynitride layer, a silicon oxide layer, a titanium oxide layer, or an aluminum oxide layer.

A gate electrode TG of the thin film transistor TFT and a first capacitor electrode CAE1 may be disposed on the gate insulating layer 130. The gate electrode TG of the thin film transistor TFT may overlap the channel region TCH in the third direction (Z-axis direction). The gate electrode TG and the first capacitor electrode CAE1 may be formed of a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A first interlayer insulating layer 141 may be disposed on the gate electrode TG and the first capacitor electrode CAE1. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may include a plurality of inorganic layers.

A second capacitor electrode CAE2 may be disposed on the first interlayer insulating layer 141. The second capacitor electrode CAE2 may overlap the first capacitor electrode CAE1 in the third direction (Z-axis direction). Therefore, a capacitor Cst may be formed by the first capacitor electrode CAE1 and the second capacitor electrode CAE2 and an inorganic insulating dielectric layer disposed therebetween to serve as a dielectric layer. The second capacitor electrode CAE2 may be formed of a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

A second interlayer insulating layer 142 may be disposed on the second capacitor electrode CAE2. The second interlayer insulating layer 142 may be formed of an inorganic layer, for example, a silicon nitride layer, a silicon oxynitride layer, a silicon oxide layer, a titanium oxide layer, or an aluminum oxide layer. The second interlayer insulating layer 142 may include a plurality of inorganic layers.

A first connection electrode CE1 may be disposed on the second interlayer insulating layer 142. The first connection electrode CE1 may be connected to the drain region TD through a first contact hole CT1 penetrating the gate insulating layer 130, the first interlayer insulating layer 141, and the second interlayer insulating layer 142. The first connection electrode CE1 may be in direct contact with the drain region TD through the first contact hole CT1. The first connection electrode CE1 may be formed of a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

A first organic layer 160 may be disposed on the first connection electrode CE1 to flatten a stepped portion formed by the thin film transistors TFT. The first organic layer 160 may be formed of an organic layer such as acryl resin, epoxy resin, phenolic resin, polyamide resin, polyimide resin and the like.

A second connection electrode CE2 may be disposed on the first organic layer 160. The second connection electrode CE2 may be connected to the first connection electrode CE1 through a second contact hole CT2 penetrating the first organic layer 160. The second connection electrode CE2 may be in direct contact with the first connection electrode CE1 through the second contact hole CT2. The second connection electrode CE2 may be formed of a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

A second organic layer 180 may be disposed on the second connection electrode CE2. The second organic layer 180 may be formed of an organic layer such as acryl resin, epoxy resin, phenolic resin, polyamide resin, polyimide resin and the like.

The light emitting element layer EML is disposed on the thin film transistor layer TFTL. The light emitting element layer EML may include light emitting elements LEL and a bank 190.

Each of the light emitting elements LEL may include a pixel electrode 171, a light emitting layer 172, and a common electrode 173. Each of a plurality of emission areas represents an area in which the pixel electrode 171, the light emitting layer 172, and the common electrode 173 are sequentially stacked, and holes from the pixel electrode 171 and electrons from the common electrode 173 are combined with each other in the light emitting layer 172 to emit light. In this case, the pixel electrode 171 may be an anode electrode, and the common electrode 173 may be a cathode electrode.

The pixel electrode 171 may be formed on the second organic layer 180. The pixel electrode 171 may be connected to the first connection electrode CE1 through a third contact hole CT3 penetrating the second organic layer 180. In this case, the pixel electrode 171 may be in direct contact with the second connection electrode CE2 through the third contact hole CT3.

In a top emission structure that emits light toward the common electrode 173 with respect to the light emitting layer 172, the pixel electrode 171 may be formed of a single layer of molybdenum (Mo), titanium (Ti), copper (Cu), or aluminum (Al), or may be formed to have a stacked structure (Ti/Al/Ti) of aluminum and titanium, a stacked structure (ITO/Al/ITO) of aluminum and ITO, an APC alloy, or a stacked structure (ITO/APC/ITO) of APC alloy and ITO to increase the reflectivity. The APC alloy is an alloy of silver (Ag), palladium (Pd) and copper (Cu).

The bank 190 serves to define the emission areas of the display pixels. To accomplish this, the bank 190 may be formed to expose a partial region of the pixel electrode 171 on the second organic layer 180. The bank 190 may cover the edge of the pixel electrode 171. The bank 190 may be disposed in a contact hole penetrating the second organic layer 180. Therefore, the third contact hole CT3 penetrating the second organic layer 180 may be filled with the bank 190. The bank 190 may be formed of an organic layer such as acryl resin, epoxy resin, phenolic resin, polyamide resin, polyimide resin and the like.

A spacer 191 may be disposed on the bank 190. The spacer 191 may serve to support a mask during a process of manufacturing the light emitting layer 172. The spacer 191 may be formed of an organic layer such as acryl resin, epoxy resin, phenolic resin, polyamide resin, polyimide resin and the like.

The light emitting layer 172 is formed on the pixel electrode 171. The light emitting layer 172 may include an organic material to emit light in a predetermined color. For example, the light emitting layer 172 may include a hole transporting layer, an organic material layer, and an electron transporting layer. The organic material layer may include a host and a dopant. The organic material layer may include a material that emits predetermined light, and may be formed using a phosphorescent material or a fluorescent material.

For example, the organic material layer of the light emitting layer 172 in a first emission area for emitting light of a first color may be a phosphorescent material including a host material including carbazole biphenyl (CBP) or mCP (1,3-bis(carbazol-9-yl), and a dopant including at least one selected from the group consisting of PIQIr(acac)(bis(1-phenylisoquinoline)acetylacetonate iridium), PQIr(acac)(bis (1-phenylquinoline)acetylacetonate iridium), PQIr(tris(1-phenylquinoline)iridium)) and PtOEP (octaethylporphyrin platinum). Alternatively, the organic material layer of the light emitting layer 172 of the first emission area may be a fluorescent material including PBD:Eu(DBM)3(Phen) or Perylene, but the present disclosure is not limited thereto.

The organic material layer of the light emitting layer 172 in a fourth emission area and a second emission area for emitting light of a second color may be a phosphorescent material including a host material including CBP or mCP, and a dopant material including Ir(ppy)3(fac tris(2-phenylpyridine)iridium. Alternatively, the organic material layer of the light emitting layer 172 in the fourth emission area and the second emission area for emitting the light of the second color may be a fluorescent material including tris(8-hydroxyquinolino)aluminum (Alq3), but the present disclosure is not limited thereto.

The organic material layer of the light emitting layer 172 in a third emission area for emitting the light of a third color may be a phosphorescent material including a host material including CBP or mCP, and a dopant material including (4,6-F2ppy)2Irpic or L2BD111, but the present disclosure is not limited thereto.

The common electrode 173 is formed on the light emitting layer 172. The common electrode 173 may be formed to cover the light emitting layer 172. The common electrode 173 may be a common layer which is commonly formed in the emission areas. A capping layer may be formed on the common electrode 173.

In the top emission structure, the common electrode 173 may be formed of a transparent conductive material (TCO) such as ITO or IZO capable of transmitting light or a semi-transmissive conductive material such as magnesium (Mg), silver (Ag), or an alloy of magnesium (Mg) and silver (Ag). When the common electrode 173 is formed of a semi-transmissive conductive material, the light emission efficiency can be increased due to a micro-cavity effect.

The encapsulation layer ENC may be formed on the light emitting element layer EML. The encapsulation layer ENC may include at least one inorganic layer TFE1 and TFE2 to prevent oxygen or moisture from permeating into the light emitting element layer EML. In addition, the encapsulation layer ENC may include at least one organic layer to protect the light emitting element layer EML from foreign substances such as dust. For example, the encapsulation layer ENC may include a first inorganic encapsulation layer TFE1, an organic encapsulation layer TFE2, and a second inorganic encapsulation layer TFE3.

The first inorganic encapsulation layer TFE1 may be disposed on the common electrode 173, the organic encapsulation layer TFE2 may be disposed on the first inorganic encapsulation layer TFE1, and the second inorganic encapsulation layer TFE3 may be disposed on the organic encapsulation layer TFE2. The first inorganic encapsulation layer TFE1 and the second inorganic encapsulation layer TFE3 may be formed of a multilayer in which one or more inorganic layers of a silicon nitride layer, a silicon oxynitride layer, a silicon oxide layer, a titanium oxide layer and an aluminum oxide layer are alternately stacked. The encapsulation organic layer TFE2 may be an organic layer such as acryl resin, epoxy resin, phenolic resin, polyamide resin, polyimide resin or the like.

The sensor electrode layer SENL is disposed on the encapsulation layer ENC. The sensor electrode layer SENL may include the sensor electrodes.

A third buffer layer BF3 may be disposed on the encapsulation layer ENC. For example, the third buffer layer BF3 may be conformally formed on the encapsulation layer ENC. The third buffer layer BF3 may be a layer having insulating and optical functions. The third buffer layer BF3 may include at least one inorganic layer. For example, the third buffer layer BF3 may be formed of a multilayer in which one or more inorganic layers of a silicon nitride layer, a silicon oxynitride layer, a silicon oxide layer, a titanium oxide layer and an aluminum oxide layer are alternately stacked. The third buffer layer BF3 may be formed by a lamination process using a flexible material, a spin coating process using a solution-type material, a slit die coating process, or a deposition process. The third buffer layer BF3 may be omitted.

First connection portions BE1 may be disposed on the third buffer layer BF3. The first connection portions BE1 may be in direct contact with the third buffer layer BF3. The first connection portions BE1 may be formed of a single layer containing molybdenum (Mo), titanium (Ti), copper (Cu), or aluminum (Al), or may be formed to have a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO.

A first sensor insulating layer TINS1 may be disposed on the first connection portions BE1. The first sensor insulating layer TINS1 may be a layer having insulating and optical functions. The first sensor insulating layer TINS1 may be formed of an inorganic layer, for example, a silicon nitride layer, a silicon oxynitride layer, a silicon oxide layer, a titanium oxide layer, or an aluminum oxide layer. The first sensor insulating layer TINS1 may be formed by a lamination process using a flexible material, a spin coating process using a solution-type material, a slit die coating process, or a deposition process.

The sensor electrodes, e.g., driving electrodes TE and sensing electrodes RE may be disposed on the first sensor insulating layer TNIS1. In addition, dummy patterns may be disposed on the first sensor insulating layer TNIS1. The driving electrodes TE, the sensing electrodes RE, and the dummy patterns do not overlap the emission areas. The driving electrodes TE, the sensing electrodes RE, and the dummy patterns may be formed of a single layer containing molybdenum (Mo), titanium (Ti), copper (Cu), or aluminum (Al), or may be formed to have a stacked structure (Ti/Al/Ti) of aluminum and titanium, a stacked structure (ITO/AI/ITO) of aluminum and indium tin oxide (ITO), an Ag—Pd—Cu (APC) alloy, or a stacked structure (ITO/APC/ITO) of APC alloy and ITO.

A second sensor insulating layer TINS2 may be disposed on the driving electrodes TE, the sensing electrodes RE, and the dummy patterns. The second sensor insulating layer TINS2 may be a layer having an insulating function and an optical function. The second sensor insulating layer TINS2 may include at least one of an inorganic layer or an organic layer. The inorganic layer may be a silicon nitride layer, a silicon oxynitride layer, a silicon oxide layer, a titanium oxide layer, or an aluminum oxide layer. The organic layer may include acryl resin, epoxy resin, phenolic resin, polyamide resin, or polyimide resin. The second sensor insulating layer TINS2 may be formed by a lamination process using a flexible material, a spin coating process using a solution-type material, a slit die coating process, or a deposition process.

A heat dissipation layer HSL of the panel lower cover PB may be disposed on the bottom surface of the support substrate SSUB of the substrate SUB. The heat dissipation layer HSL may be formed of a metal thin film such as copper, nickel, ferrite, or silver that can shield electromagnetic waves and has excellent thermal conductivity.

Figure 23:
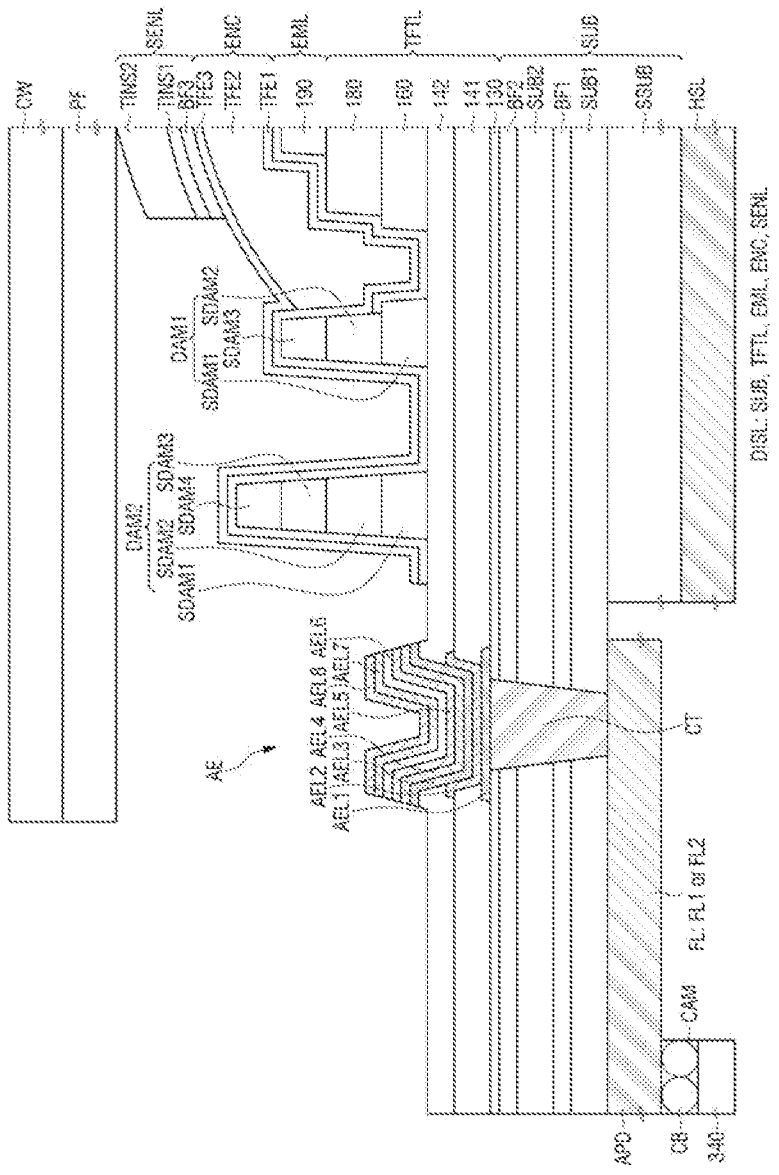
FIG. 23 is a cross-sectional view of a boundary between the antenna area and the non-display area adjacent thereto in the display device according to one embodiment.

FIG. 23 is a cross-sectional view of a boundary between the antenna area AA and the non-display area NDA adjacent thereto in the display device 10 according to one embodiment.

Referring to FIG. 23, a dam DAM surrounding the display area DA may be disposed in the non-display area NDA of the display panel 300. The dam DAM may include a first dam DAM1 of the encapsulation layer ENC and a second dam DAM2 disposed more outward than the first dam DAM1. The first dam DAM1 and the second dam DAM2 may be disposed on the second interlayer insulating layer 142.

The first dam DAM1 may include a first sub-dam SDAM1, a second sub-dam SDAM2, and a third sub-dam SDAM3 which are sequentially stacked. The first sub-dam SDAM1 may be formed of the same material as the first organic layer 160, the second sub-dam SDAM2 may be formed of the same material as the second organic layer 180, and the third sub-dam SDAM3 may be formed of the same material as the bank 190.

The second dam DAM2 may include a first sub-dam SDAM1, a second sub-dam SDAM2, a third sub-dam SDAM3, and a fourth sub-dam SDAM4 which are sequentially stacked. The first sub-dam SDMA1 may be formed of the same material as the first organic layer 160, and the second sub-dam SDAM2 may be formed of the same material as the second organic layer 180. The third sub-dam SDAM3 may be formed of the same material as the bank 190, and the fourth sub-dam SDAM4 may be formed of the same material as the spacer 191 (see FIG. 22).

In FIG. 23, an antenna electrode AE may refer to the antenna electrodes AE1, AE2, and AE3 (see FIG. 13) of the first antenna ANT1 or the antenna electrodes AE4, AE5, and AE6 (see FIG. 16) of the second antenna ANT2 which have been described with reference to FIGS. 7 to 21. For example, the antenna electrode AE of FIG. 23 may represent at least one of the first antenna electrode AE1, the second antenna electrode AE2, and the third antenna electrode AE3 of the first antenna ANT1. Alternatively, the antenna electrode AE of FIG. 23 may represent at least one of the fourth antenna electrode AE4, the fifth antenna electrode AE5, and the sixth antenna electrode AE6 of the second antenna ANT2.

Referring to FIG. 23, the antenna electrode AE may include first, second, third, fourth, fifth, sixth, seventh and eighth antenna electrode layers AEL1, AEL2, AEL3, AEL4, AEL5, AEL6, ARL7 and AEL8. However, the embodiment of the present disclosure is not limited thereto, and the antenna electrode AE may include only some antenna electrode layers among the first to eighth antenna electrode layers AEL1 to AEL8. For example, the antenna electrodes of the first antenna ANT1 or the antenna electrodes of the second antenna ANT2 described with reference to FIGS. 7 to 21 may be formed by at least one antenna electrode layer selected from the first to eighth antenna electrode layers AEL1 to AEL8.

The first antenna electrode layer AEL1 may be made of the same material and be formed by the same process as the gate electrode TG (see FIG. 22) of the thin film transistor TFT (see FIG. 22) and the first capacitor electrode CAE1 (see FIG. 22).

The second antenna electrode layer AEL2 may be disposed on the first antenna electrode layer AEL1 exposed without being covered with the first interlayer insulating layer 141 (see FIG. 22). The second antenna electrode layer AEL2 may be made of the same material and be formed by the same process as the second capacitor electrode CAE2 (see FIG. 22).

The third antenna electrode layer AEL3 may be disposed on the second antenna electrode layer AEL2 exposed without being covered with the second interlayer insulating layer 142 (see FIG. 22). The third antenna electrode layer AEL3 may be made of the same material and be formed by the same process as the first connection electrode CE1 (see FIG. 22).

The fourth antenna electrode layer AEL4 may be disposed on the third antenna electrode layer AEL3. The fourth antenna electrode layer AEL4 may be made of the same material and be formed by the same process as the second connection electrode CE2 (see FIG. 22).

The fifth antenna electrode layer AEL5 may be disposed on the fourth antenna electrode layer AEL4. The fifth antenna electrode layer AEL5 may be made of the same material and be formed by the same process as the pixel electrode 171 (see FIG. 22).

The sixth antenna electrode layer AEL6 may be disposed on the fifth antenna electrode layer AEL5. The sixth antenna electrode layer AEL6 may be made of the same material and be formed by the same process as the common electrode 173 (see FIG. 22).

The seventh antenna electrode layer AEL7 may be disposed on the sixth antenna electrode layer AEL6. The seventh antenna electrode layer AEL7 may be made of the same material and be formed by the same process as the first connection portion BE1 (see FIG. 22) of the sensor electrode layer SENL.

The eighth antenna electrode layer AEL8 may be disposed on the seventh antenna electrode layer AEL7. The eighth antenna electrode layer AEL8 may be made of the same material and be formed by the same process as the driving electrode TE (see FIG. 22), the sensing electrode RE (see FIG. 22), and/or the dummy pattern of the sensor electrode layer SENL. As shown in FIG. 23, the first to eighth antenna electrode layers AEL1 to AEL8 may be sequentially stacked.

A through hole CT may pass through the first substrate SUB1, the first buffer layer BF1, the second substrate SUB2, and the second buffer layer BF2 of the substrate SUB. In addition, the through hole CT may pass through the gate insulating layer 130. The through hole CT may be in direct contact with the first antenna electrode layer AEL1.

The antenna electrode AE may be in contact with a power feed line FL through the through hole CT. Here, the power feed line FL may be the first power feed line FL1 or the second power feed line FL2 described with reference to FIGS. 7 to 21.

The antenna pad APD electrically connected to the power feed line FL may be disposed at the end of the power feed line FL. The power feed line FL and the antenna pad APD may be disposed on the bottom surface of the first substrate SUB1 of the substrate SUB. Since the antenna area AA is bent and disposed below the main area MA, the support substrate SSUB of the substrate SUB may be removed from the antenna area AA where the power feed line FL is disposed.

The antenna pad APD may be connected to the antenna circuit board 340 using an anisotropic conductive film (ACF) including a conductive ball CB and a conductive adhesive member CAM such as an anisotropic conductive adhesive.

Figure 24:
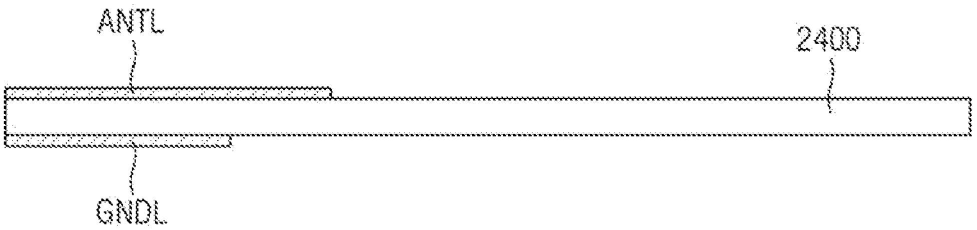
FIG. 24 is a cross-sectional view illustrating a method of forming an antenna according to one embodiment on a transparent dielectric layer using a flexible printed circuit board (FPCB) manufacturing process.
Figure 25:
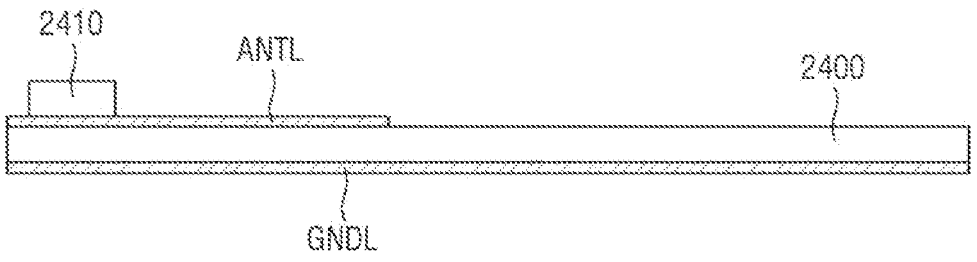
FIG. 25 is a cross-sectional view illustrating an example in which an electronic component is mounted above the transparent dielectric layer.
Figure 26:
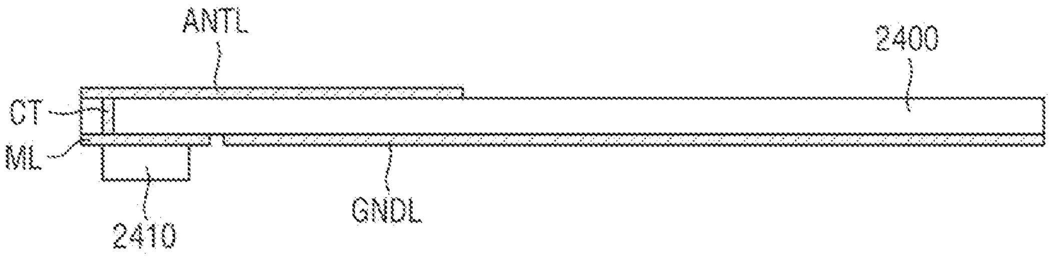
FIG. 26 is a cross-sectional view illustrating an example in which the electronic component is mounted below the transparent dielectric layer.

FIG. 24 is a cross-sectional view illustrating a method of forming an antenna according to one embodiment on a transparent dielectric layer 2400 using an FPCB manufacturing process. FIG. 25 is a cross-sectional view illustrating an example in which an electronic component 2410 is mounted above the transparent dielectric layer 2400. FIG. 26 is a cross-sectional view illustrating an example in which the electronic component 2410 is mounted below the transparent dielectric layer 2400.

Referring to FIGS. 24 to 26, the display device 10 according to one embodiment may include an antenna module for wireless communication formed using the FPCB manufacturing process. The antenna module may be manufactured by forming an antenna layer ANTL including the antenna electrodes (e.g., AE1, AE2, and AE3 of FIG. 13, and/or AE4, AES, and AE6 of FIG. 16) on the top surface of the transparent dielectric layer 2400, and forming a ground layer GNDL including the ground lines (e.g., GND1 and GND2 of FIG. 13, and/or GND3 and GND4 of FIG. 16) on the bottom surface of the transparent dielectric layer 2400, using the FPCB manufacturing process. The antenna layer ANTL may overlap the ground layer GNDL with the transparent dielectric layer 2400 therebetween. The transparent dielectric layer 2400 may include a plastic material such as polycarbonate (PC) or polyethylene terephthalate (PET).

The antenna module of the present disclosure has an integrated structure of an antenna film and FPCB that does not require bonding using an anisotropic conductive film (ACF), and thus may have the following advantages. The antenna module of the present disclosure does not require a space for pad design and bonding, so design margins may be reduced, compared to a method of attaching an antenna film provided with an antenna electrode and an FPCB provided separately therefrom using an anisotropic conductive film (ACF). In addition, in the antenna module of the present disclosure, a height difference due to the stacked structure of the double films between the antenna film and the FPCB may not occur, and issues such as air bubbles that may occur during the deposition process may be prevented.

Referring to FIG. 24, the antenna module of the display device 10 according to one embodiment may include the transparent dielectric layer 2400 serving as a base film, the antenna layer ANTL disposed on the top surface of the transparent dielectric layer 2400, and the ground layer GNDL disposed on the bottom surface of the transparent dielectric layer 2400. Here, the antenna layer ANTL may include the antenna electrode, the power feed lines FL1 and FL2 (see FIG. 7), and/or the antenna pad APD (see FIG. 1). In addition, the ground layer GNDL may include the ground line disposed to correspond to the power feed line of the antenna layer ANTL.

Referring to FIG. 25, the antenna module of the display device 10 according to one embodiment may include the electronic component 2410 disposed on the top surface of the transparent dielectric layer 2400. For example, the electronic component 2410 may be an antenna driving circuit, and the role of the antenna driving circuit may be substantially the same as that of the antenna driving circuit 350 described with reference to FIG. 4. The electronic component 2410 may be attached to antenna pads disposed on the top surface of the transparent dielectric layer 2400. For example, the electronic component 2140 may be located on the antenna layer ANTL.

Referring to FIG. 26, the antenna module of the display device 10 according to one embodiment may include the electronic component 2410 disposed on the bottom surface of the transparent dielectric layer 2400. For example, the electronic component 2410 may be an antenna driving circuit, and the role of the antenna driving circuit may be substantially the same as that of the antenna driving circuit described with reference to FIG. 4. The electronic component 2410 may be attached to antenna pads disposed on the bottom surface of the transparent dielectric layer 2400. In this case, the antenna pads disposed on the bottom surface of the transparent dielectric layer 2400 may be provided on a metal layer ML formed on the same layer as the ground layer GNDL. The antenna pads APD of the metal layer ML may be electrically connected to a part of the power feed line FL formed in the antenna layer ANTL through the contact hole CT penetrating the transparent dielectric layer 2400.

Figure 27:
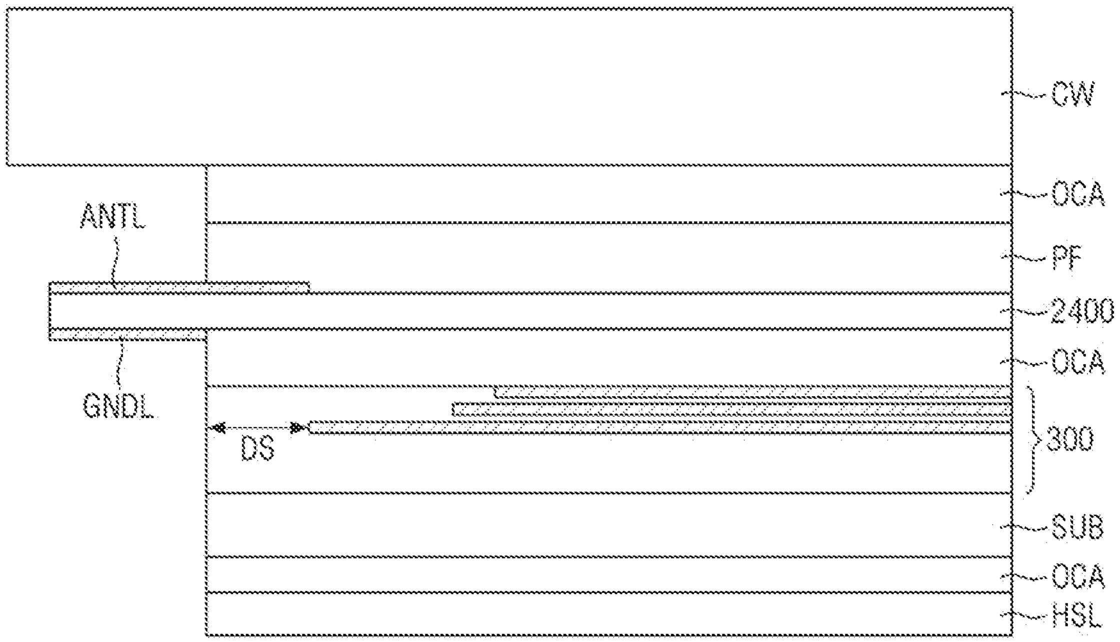
FIG. 27 is a cross-sectional view illustrating an example of the display device in which the transparent dielectric layer including an antenna is attached on the display panel.

FIG. 27 is a cross-sectional view illustrating an example of the display device 10 in which the transparent dielectric layer 2400 including an antenna is attached on the display panel 300.

The display device 10 shown in FIG. 27 may include an embodiment that is at least partially similar to or different from the display device 10 shown in FIGS. 22 and 23. The embodiment of FIG. 27 differs from the embodiment of FIGS. 22 and 23 in that the transparent dielectric layer 2400 including the antenna is formed on the display panel 300. In FIG. 27, the display panel 300 may include the substrate SUB, the display layer DISL, the encapsulation layer ENC, and the sensor electrode layer SENL described with reference to FIGS. 22 and 23. In FIG. 27, redundant parts of the description made with reference to FIGS. 22 and 23 will be omitted.

Referring to FIG. 27, in the display device 10 according to one embodiment, the transparent dielectric layer 2400 including the antenna may be attached onto the display panel 300 by a transparent adhesive member such as an optically clear adhesive (OCA) film.

The antenna layer ANTL including the antenna electrode and/or the power feed line is disposed on the top surface of the transparent dielectric layer 2400. The ground layer GNDL including the ground line disposed to correspond to the power feed line of the antenna layer ANTL is disposed on the bottom surface of the transparent dielectric layer 2400. Here, the antenna electrode may be disposed to correspond to a part of the dead space area DS, which is the non-display area NDA of the display panel 300.

The end of the transparent dielectric layer 2400 may be disposed to extend outside the display panel 300. For example, the transparent dielectric layer 2400 may include a first portion that overlaps the display panel 300, and a second portion that extends from the boundary of the first portion toward the outside (e.g., leftward in the illustrated example) of the display panel 300 and does not overlap the display panel 300. The second portion of the transparent dielectric layer 2400 may be overlapped by the cover window CW. The antenna electrode may be disposed on the first portion of the transparent dielectric layer 2400 to correspond to the dead space area DS of the display panel 300. The power feed line electrically connected to the antenna electrode, and the ground layer GNDL overlapping the power feed line may be disposed on the second portion of the transparent dielectric layer 2400.

The second portion of the transparent dielectric layer 2400, e.g., a part of the transparent dielectric layer 2400 on which the power feed line of the antenna layer ANTL and the ground layer GNDL are formed may be bent, and the bent second portion of the transparent dielectric layer 2400 may be disposed under the display panel 300.

Figure 28:
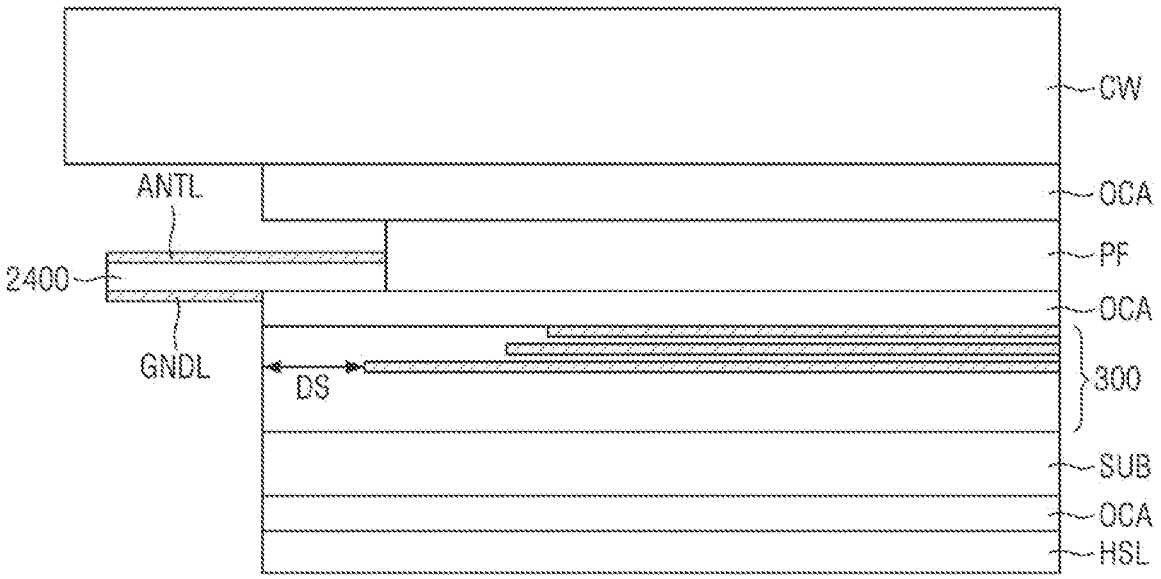
FIG. 28 is a cross-sectional view illustrating another example of the display device in which the transparent dielectric layer including an antenna is attached on the display panel.

FIG. 28 is a cross-sectional view illustrating another example of the display device 10 in which the transparent dielectric layer 2400 including an antenna is attached on the display panel 300.

The display device 10 shown in FIG. 28 may include an embodiment that is at least partially similar to or different from the display device 10 shown in FIG. 27. The embodiment of FIG. 28 differs from the embodiment of FIG. 27 in that a part of the polarizing film corresponding to the dead space area DS is removed and the transparent dielectric layer 2400 including the antenna is formed on the display panel 300 from which the polarizing film has been removed. In FIG. 28, redundant parts of the description made with reference to FIG. 27 will be omitted.

Referring to FIG. 28, in the display device 10 according to one embodiment, the polarizing film is removed from an area corresponding to the dead space area DS, and the transparent dielectric layer 2400 including the antenna is disposed in the area from which the polarizing film has been removed. The antenna electrode may be disposed on the first portion of the transparent dielectric layer 2400 to correspond to the dead space area DS of the display panel 300. The power feed line electrically connected to the antenna electrode, and the ground layer GNDL overlapping the power feed line may be disposed on the second portion of the transparent dielectric layer 2400. According to one embodiment, a power feed portion (e.g., a power feed pad) electrically connected to the power feed line is disposed outside the display panel 300, but may be disposed on the top surface of the transparent dielectric layer 2400 or on the bottom surface of the transparent dielectric layer 2400. The embodiment of FIG. 28 may reduce the thickness of the display device 10 compared to the embodiment of FIG. 27.

Figure 29:
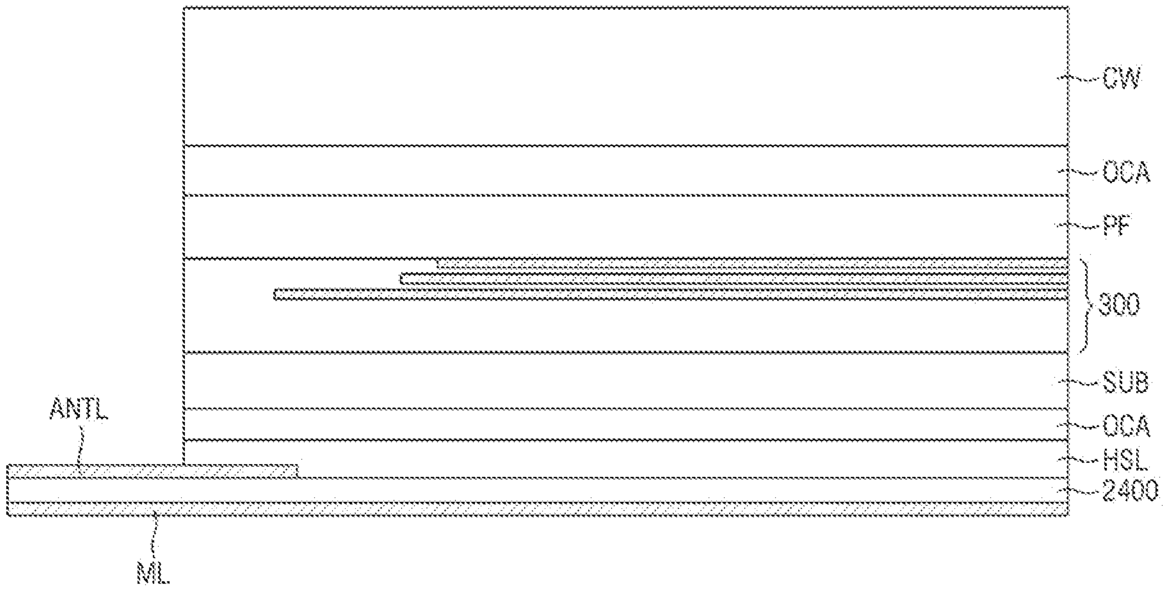
FIG. 29 is a cross-sectional view illustrating an example of the display device in which the transparent dielectric layer including an antenna is disposed under the display panel.

FIG. 29 is a cross-sectional view illustrating an example of the display device 10 in which the transparent dielectric layer 2400 including an antenna is disposed under the display panel 300.

The display device 10 shown in FIG. 29 may include an embodiment that is at least partially similar to or different from the display device 10 shown in FIG. 27. The embodiment of FIG. 29 differs from the embodiment of FIG. 27 in that the transparent dielectric layer 2400 including the antenna is disposed under the display panel 300. In FIG. 29, redundant parts of the description made with reference to FIG. 27 will be omitted.

Referring to FIG. 29, in the display device 10 according to one embodiment, the transparent dielectric layer 2400 including the antenna is disposed on the bottom surface of the heat dissipation layer HSL. Here, the heat dissipation layer HSL may be disposed under the display panel 300 and may be formed of a metal thin film such as copper, nickel, ferrite, or silver that can shield electromagnetic waves and has excellent thermal conductivity.

In the present disclosure, the metal layer ML such as copper may be disposed on the bottom surface of the transparent dielectric layer 2400, and the antenna layer ANTL may be formed on the top surface of the transparent dielectric layer 2400, using the FPCB manufacturing process.

The transparent dielectric layer 2400 may include a first portion that overlaps the display panel 300, and a second portion that extends from the boundary of the first portion toward the outside (e.g., leftward in the illustrated example) of the display panel 300 and does not overlap the display panel 300. The antenna electrode may be disposed on the first portion of the transparent dielectric layer 2400 to correspond to the dead space area DS of the display panel 300. The antenna layer ANTL may be disposed between the transparent dielectric layer 2400 and the heat dissipation layer HSL where the antenna electrode corresponds to the dead space area DS of the display panel 300. The power feed line electrically connected to the antenna electrode and the metal layer ML (e.g., the ground layer GNDL) overlapping the power feed line may be disposed on the second portion of the transparent dielectric layer 2400.

The second portion of the transparent dielectric layer 2400, e.g., a part of the transparent dielectric layer 2400 on which the power feed line of the antenna layer ANTL and the ground layer GNDL are formed may be bent, and the bent second portion of the transparent dielectric layer 2400 may be disposed under the display panel 300.

Figure 30:
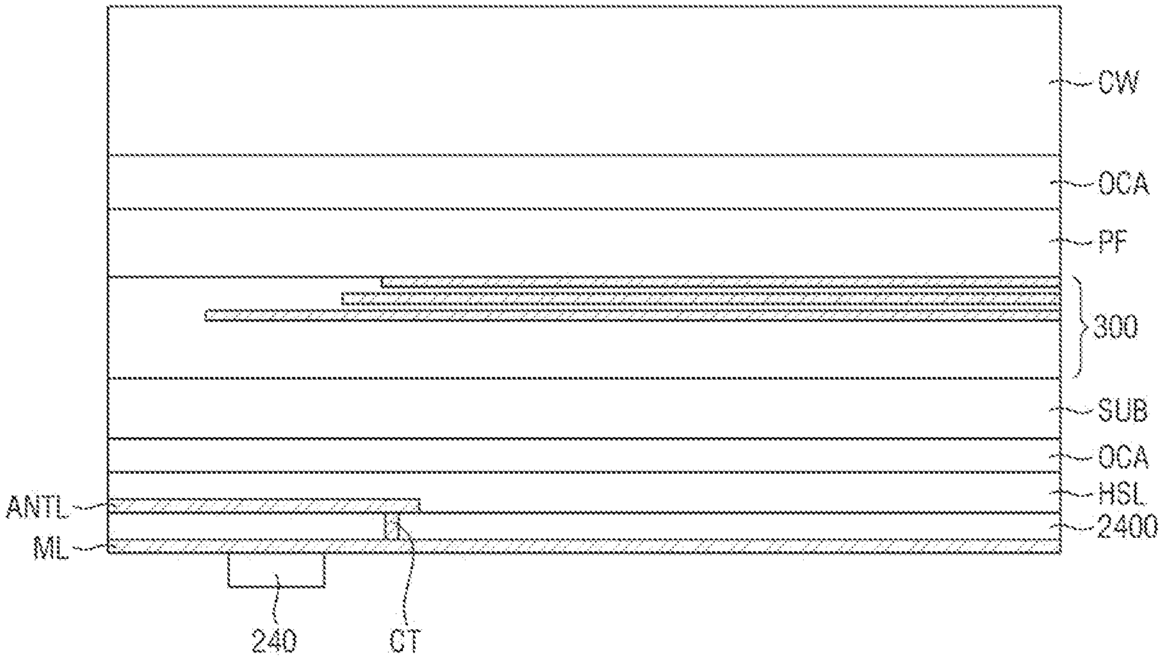
FIG. 30 is a cross-sectional view illustrating another example of the display device in which the transparent dielectric layer including an antenna is attached under the display panel.

FIG. 30 is a cross-sectional view illustrating another example of the display device 10 in which the transparent dielectric layer 2400 including an antenna is attached under the display panel 300.

The display device 10 shown in FIG. 30 may include an embodiment that is at least partially similar to or different from the display device 10 shown in FIG. 29. The embodiment of FIG. 30 differs from the embodiment of FIG. 29 in that the power feed portion of the transparent dielectric layer 2400 including the antenna is disposed to correspond to a part of the display area DA that is inside the dead space area DS. In FIG. 30, redundant parts of the description made with reference to FIG. 29 will be omitted.

Referring to FIG. 30, in the display device 10 according to one embodiment, a radio frequency (RF) signal may be radiated to the outside through an area corresponding to the dead space area DS by disposing the antenna electrode to correspond to the dead space area DS. In addition, in the display device 10, the power feed portion of the antenna may be disposed to correspond to a part of the display area DA that is inside the dead space area DS. The power feed portion of the antenna may be electrically connected to the metal layer ML (e.g., copper layer) disposed on the bottom surface of the transparent dielectric layer 2400 through the contact hole CT.

In addition, in the display device 10 according to one embodiment, the electronic component 2410 may be disposed on the metal layer ML (e.g., a copper layer) disposed on the bottom surface of the transparent dielectric layer 2400. The electronic component 2140 may overlap the antenna layer ANTL. For example, the electronic component 2410 may be an antenna driving circuit, and the role of the antenna driving circuit may be substantially the same as that of the antenna driving circuit described with reference to FIG. 4.

The metal layer ML (e.g., a copper layer) disposed on the bottom surface of the transparent dielectric layer 2400 may be disposed in a solid form as a whole. In other words, the metal layer ML may completely cover the bottom surface of the transparent dielectric layer 2400. Alternatively, the metal layer ML (e.g., a copper layer) disposed on the bottom surface of the transparent dielectric layer 2400 may include a plurality of contact holes CT in the form of predetermined patterns. In addition, at least a part of the metal layer ML (e.g., a copper layer) disposed on the bottom surface of the transparent dielectric layer 2400 may include wiring patterns at regular intervals.

Figure 31:
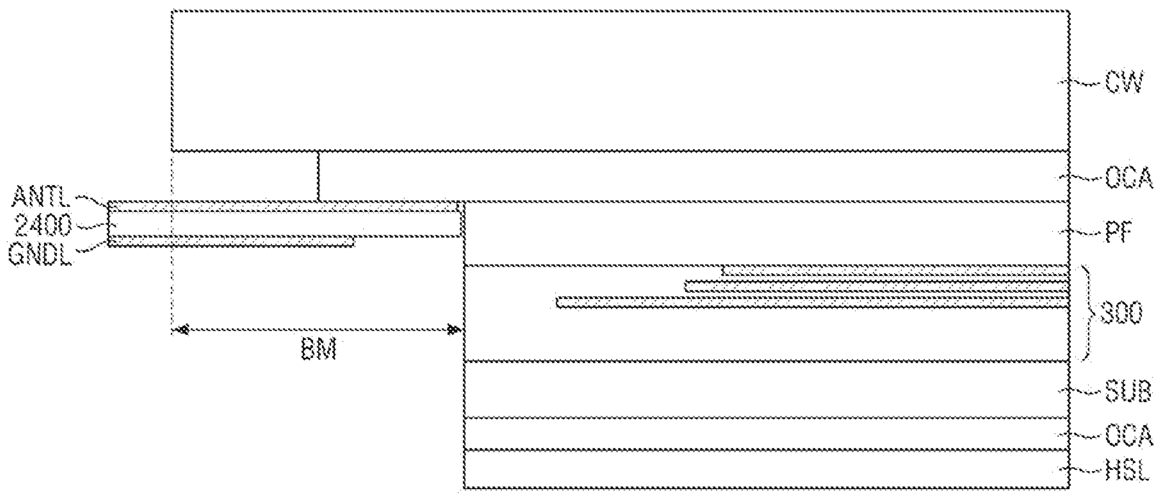
FIG. 31 is a cross-sectional view illustrating an example in which the transparent dielectric layer including an antenna is attached to the edge of the display panel to correspond to a bezel area of a cover window.

FIG. 31 is a cross-sectional view illustrating an example in which the transparent dielectric layer 2400 including an antenna is attached to the edge of the display panel 300 to correspond to a bezel area BM of the cover window CW.

The display device 10 shown in FIG. 31 may include an embodiment that is at least partially similar to or different from the display device 10 shown in FIG. 27. The embodiment of FIG. 31 differs from the embodiment of FIG. 27 in that the transparent dielectric layer 2400 including the antenna is attached to the edge of the display panel 300 to correspond to the bezel area BM of the cover window CW. In FIG. 31, redundant parts of the description made with reference to FIG. 27 will be omitted.

Referring to FIG. 31, the display device 10 according to one embodiment may include an antenna module having the transparent dielectric layer 2400 including an antenna separate from the display panel 300. For example, the transparent dielectric layer 2400 including the antenna may be disposed outside the display panel 300 and the polarizing film, and may be attached onto the bottom surface of the cover window CW to correspond to the bezel area BM of the cover window CW.

The transparent dielectric layer 2400 may include a first portion attached to the bezel area BM of the cover window CW, and a second portion that extends from the boundary of the first portion toward the outside (e.g., leftward in the illustrated example) of the cover window CW and is not attached to the bezel area BM of the cover window CW. The antenna electrode of the display panel 300 may be disposed on the first portion of the transparent dielectric layer 2400. The power feed line electrically connected to the antenna electrode and the metal layer ML (e.g., a copper layer) overlapping the power feed line may be disposed on the second portion of the transparent dielectric layer 2400.

The second portion of the transparent dielectric layer 2400, e.g., a part of the transparent dielectric layer 2400 on which the power feed line of the antenna layer ANTL and the ground layer GNDL are formed may be bent, and the bent second portion of the transparent dielectric layer 2400 may be disposed under the display panel 300.

In concluding the detailed description, those skilled in the art will appreciate that many variations and modifications can be made to the embodiments set forth herein without substantially departing from the scope of the present disclosure. Therefore, the disclosed embodiments are used in descriptive sense and not for purposes of limitation.

What is claimed is:

1. A display device comprising:

a display panel comprising a display area for displaying an image, a non-display area disposed at an edge of the display area, and an antenna area protruding from a part of the non-display area in a first direction;

an antenna module disposed on a boundary between the antenna area and a dead space area of the non-display area, wherein the dead space area is adjacent to the antenna area, and wherein the antenna module comprises a first antenna and a second antenna; and an antenna driving circuit electrically connected to the antenna module through an antenna pad disposed on the antenna area, wherein the first antenna is configured to generate an X-axis polarization parallel to the first direction, wherein the second antenna is configured to generate a Y-axis polarization in a second direction perpendicular to the first direction, and wherein first antenna is connected to a first feed line and the second antenna is connected to a second feed line and the first and second feed lines extend parallel to each other within the display area.

2. A display device comprising:

a display panel comprising a display area for displaying an image, a non-display area disposed at an edge of the display area, and an antenna area protruding from a part of the non-display area in a first direction;

an antenna module disposed on a boundary between the antenna area and a dead space area of the non-display area, wherein the dead space area is adjacent to the antenna area, and wherein the antenna module comprises a first antenna and a second antenna; and an antenna driving circuit electrically connected to the antenna module through an antenna pad disposed on the antenna area, wherein the first antenna is configured to generate an X-axis polarization parallel to the first direction, wherein the second antenna is configured to generate a Y-axis polarization in a second direction perpendicular to the first direction, wherein the first antenna comprises:

a first antenna electrode connected to a first feed line;

a second antenna electrode comprising a first slot branched in one direction from a first end of the first antenna electrode, wherein the second antenna electrode is connected to a first ground line, and has a length extending in the first direction; and a third antenna electrode comprising a second slot branched from the first end of the first antenna electrode in another direction opposite to the one direction, wherein the third antenna is connected to a second ground line, and has a length extending in the first direction, and wherein the first slot and the second slot are symmetrical with respect to the first antenna electrode.

3. The display device of claim 2, wherein the second antenna electrode of the first antenna comprises another first slot, and a connection slot extending in the second direction to connect the first slots to each other, and the third antenna electrode of the first antenna comprises another second slot, and a connection slot extending in the second direction to connect the second slots to each other.

4. The display device of claim 2, wherein the first antenna electrode is spaced apart from the first feed line.

5. The display device of claim 2, wherein the first antenna electrode has a tapered shape such that is has a first width in a region closest to the first feed line and a second width greater than the first width in a region farthest from the first feed line.

6. The display device of claim 2, wherein the first antenna further comprises at least one slit disposed in parallel with the first slot and extending in the first direction.

7. The display device of claim 2, wherein the first feed line, the first ground line, and the second ground line are disposed on one surface of the antenna area, and the first feed line is disposed between the first ground line and the second ground line.

8. The display device of claim 2, wherein the second antenna comprises:

a fourth antenna electrode connected to a second feed line;

a fifth antenna electrode comprising a third slot branched in one direction from a first end of the fourth antenna electrode, wherein the fifth antenna electrode is connected to a third ground line, and has a length extending in the second direction; and a sixth antenna electrode comprising a fourth slot branched from the first end of the fourth antenna electrode in another direction opposite to the one direction, wherein the sixth antenna electrode is connected to a fourth ground line, and has a length extending in the second direction, wherein a length of the fifth antenna electrode in the second direction is longer than a length of the sixth antenna electrode in the second direction;

a length of the third slot in the second direction is longer than a length of the fourth slot in the second direction.

9. The display device of claim 8, wherein the second feed line, the third ground line, and the fourth ground line are disposed on one surface of the antenna area, and the second feed line is disposed between the third ground line and the fourth ground line.

10. The display device of claim 8, wherein the first antenna and the second antenna are spaced apart from each other in the second direction.

11. The display device of claim 8, wherein the antenna module comprises a pair of second antennas and a single first antenna, and the first antenna is disposed between the pair of second antennas.

12. The display device of claim 8, wherein the antenna module comprises a pair of first antennas and a single second antenna, and the second antenna is disposed between the pair of first antennas.

13. The display device of claim 8, wherein the antenna module comprises a first antenna group comprising a plurality of first antennas and a second antenna group comprising a plurality of second antennas, and the first antenna group and the second antenna group are spaced apart from each other.

14. The display device of claim 1, wherein the first antenna is disposed in a part of the dead space area and a part of the antenna area, and the second antenna is disposed parallel to the first antenna in the dead space area.

15. The display device of claim 1, wherein the first antenna is disposed in a part of the dead space area, and the second antenna is disposed parallel to the first antenna in the dead space area.

16. The display device of claim 1, wherein at least a part of the antenna area is bent and disposed under the display panel.

17. The display device of claim 1, wherein the first antenna and the second antenna are formed by the same process as at least some metals contained in a thin film transistor layer of the display panel.

18. The display device of claim 1, wherein the first antenna and the second antenna are formed by the same process as at least some metals contained in a sensor electrode layer of the display panel.

19. The display device of claim 1, wherein the antenna module comprises a stacked structure formed by a flexible printed circuit board (FPCB) manufacturing process, the stacked structure of the antenna module comprises:

a transparent dielectric layer attached to the display panel;

an antenna layer disposed on a top surface of the transparent dielectric layer; and a ground layer disposed on a bottom surface of the transparent dielectric layer, wherein the antenna layer comprises an antenna electrode of each of the first antenna and the second antenna, and the ground layer comprises a ground line.

20. An electronic device, comprising:

a display panel, comprising:

a display area for displaying an image;

a non-display area disposed at an edge of the display area; and an antenna area protruding from the non-display area in a first direction, the display panel further comprising:

an antenna module disposed on a boundary between the antenna area and a dead space area of the non-display area, wherein the dead space area is adjacent to the antenna area, and wherein the antenna module includes a first antenna and two second antenna; and an antenna driving circuit electrically connected to the antenna module through an antenna pad disposed on the antenna area, wherein the first antenna is configured to generate an X-axis polarization parallel to the first direction, wherein each of the two second antenna is configured to generate a Y-axis polarization in a second direction perpendicular to the first direction, and wherein the display area has a plurality of sides and the first antenna is disposed between the two second antenna on a same side of the display area.

* * * * *